US012727038B2

(12) United States Patent
Zhu et al.

(10) Patent No.: US 12,727,038 B2
(45) Date of Patent: Sep. 1, 2026

(54) IAB NODE CONNECTION UPDATE METHOD AND APPARATUS

(71) Applicant: HUAWEI TECHNOLOGIES CO., LTD., Shenzhen (CN)

(72) Inventors: Yuanping Zhu, Shanghai (CN); Yulong Shi, Beijing (CN); Zhenzhen Cao, Boulogne Billancourt (FR); Jing Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 289 days.

(21) Appl. No.: 18/502,261

(22) Filed: Nov. 6, 2023

(65) Prior Publication Data

US 2024/0073971 A1 Feb. 29, 2024

Related U.S. Application Data

(63) Continuation of application No. PCT/CN2022/091157, filed on May 6, 2022.

(30) Foreign Application Priority Data

May 7, 2021 (CN) ........................ 202110497401.2

(51) Int. Cl.
*H04W 76/10* (2018.01)
*H04W 76/20* (2018.01)
*H04W 36/08* (2009.01)

(52) U.S. Cl.
CPC .......... *H04W 76/10* (2018.02); *H04W 76/20* (2018.02); *H04W 36/087* (2023.05)

(58) Field of Classification Search
CPC .... H04W 76/10; H04W 76/20; H04W 36/087
See application file for complete search history.

(56) References Cited

U.S. PATENT DOCUMENTS

2021/0392565 A1* 12/2021 Akl ........................ H04L 45/24
2022/0086695 A1* 3/2022 Akl ........................ H04W 28/16
2022/0225060 A1* 7/2022 Akl ........................ H04W 76/22

OTHER PUBLICATIONS

Samsung (Moderator), "Summary of offline discussion on topology redundancy," 3GPP TSG-RAN WG3 #111-e, R3-211004, Jan. 25-Feb. 4, 2021, 30 pages.
Huawei et al., "Miscellaneous corrections on BAP transmitting operation and default routing," 3GPP TSG-RAN WG2 Meeting #113b-e, R2-2104165, Apr. 12-20, 2021, 5 pages.
Qualcomm Incorporated, "Integrated Access and Backhaul for NR," 3GPP TSG RAN Meeting #88e, RP-200839, Jun. 29-Jul. 3, 2020, 46 pages.

(Continued)

*Primary Examiner* — Brenda H Pham
(74) *Attorney, Agent, or Firm* — Fish & Richardson P.C.

(57) ABSTRACT

The present disclosure relates to methods applied to an integrated access and backhaul (IAB) node. An example method includes receiving configuration information for setup of a distributed unit (DU) part of the IAB node and determining, based on a manner of receiving the configuration information, that a master node of the IAB node or a secondary node of the IAB node is a donor node of the IAB node.

15 Claims, 10 Drawing Sheets

A source IAB donor determines that a DU part of a first IAB node needs to perform a connection update to establish an F1 connection to a target IAB donor — S802

↓

The first IAB node receives first indication information — S804

↓

The DU part of the first IAB node establishes the F1 connection to the target IAB donor based on the first indication information — S806

(56) References Cited

OTHER PUBLICATIONS

3GPP TS 37.340 V16.1.0, "3rd Generation Partnership Project; Technical Specification Group Radio Access Network; Evolved Universal Terrestrial Radio Access (E-UTRA) and NR; Multiconnectivity; Stage 2; (Release 16)," Mar. 2020, 74 pages.
Extended European Search Report in European Appln. No. 22798657.7, mailed on Sep. 16, 2024, 9 pages.
3GPP TS 38.321 V15.12.0, 3rd Generation Partnership Project; Technical Specification Group Radio Access Network; NR; Medium Access Control (MAC) protocol specification (Release 15), Mar. 2021, 79 pages.
3GPP TS 38.401 V16.5.0, 3rd Generation Partnership Project; Technical Specification Group Radio Access Network; NG-RAN; Architecture description (Release 16), Apr. 2021, 79 pages.
3GPP TS 38.423 V16.5.0, 3rd Generation Partnership Project; Technical Specification Group Radio Access Network; NG-RAN; Xn application protocol (XnAP) (Release 16), Apr. 2021, 461 pages.
Ericsson, "LCID and LCG Extension in IAB Networks," 3GPP TSG-RAN WG2 #107bis, R2-1913182, Chongqing, P.R. of China, Oct. 14-18, 2019, 6 pages.
Samsung, "Discussion on inter-donor topology redundancy for IAB," 3GPP TSG-RAN WG3 #110-e, R3-206002, Online, Nov. 2-12, 2020, 4 pages.
ZTE et al., "Discussion on inter-CU IAB migration handling," 3GPP TSG RAN WG3 Meeting #106, R3-196689, Reno, USA, Nov. 18-22, 2019, 4 pages.
Office Action in India Appln. No. 2023-17076830, mailed on Apr. 27, 2026, 7 pages.

* cited by examiner

Third determining module
1502
Third transceiver module
1504

Fourth determining module
1602
Seventh transceiver module
1604

Eighth transceiver module
1702
Activation module
1704

IAB NODE CONNECTION UPDATE METHOD AND APPARATUS

CROSS-REFERENCE TO RELATED APPLICATIONS

This application is a continuation of International Application No. PCT/CN2022/091157, filed on May 6, 2022, which claims priority to Chinese Patent Application No. 202110497401.2, filed on May 7, 2021. The disclosures of the aforementioned applications are hereby incorporated by reference in their entireties.

TECHNICAL FIELD

This application relates to the field of communication technologies, and in particular, to an IAB node connection update method and apparatus.

BACKGROUND

Compared with a fourth generation mobile communication network (4th generation mobile network, 4G), a fifth generation mobile communication network (5th generation mobile network, 5G) imposes stricter requirements on network performance indicators in an all-round way, for example, capacity indicators improved by 1000 times, wider coverage requirements, ultra-high reliability and ultra-low latency. In an aspect, considering that high-frequency carrier frequency resources are abundant, high-frequency small cell networking becomes increasingly popular in hotspot areas to meet ultra-high capacity requirements of 5G. However, high-frequency carriers have poor propagation characteristics, severe attenuation due to blocking, and a small coverage area. Therefore, a large quantity of high-frequency small cells need to be intensively deployed. Correspondingly, providing fiber backhaul for the large quantity of intensively deployed high-frequency small cells needs high costs and has great difficulty in construction. Therefore, an economical and convenient backhaul solution is needed. In another aspect, from the perspective of wide coverage requirements, to provide network coverage in some remote areas, fiber deployment is difficult and expensive. Therefore, a flexible and convenient access and backhaul solution is needed.

SUMMARY

Embodiments of this application provide an IAB node connection update method and apparatus, to implement switching of a DU part of an IAB node and switching of a cell served by the DU part of the IAB node between two different IAB donors.

According to a first aspect, an embodiment of this application provides an IAB node connection update method, applied to a first IAB node, where the first IAB node includes an MT part and a DU part, and is capable of providing access and backhaul services for one or more descendent UEs and/or descendent IAB nodes; the first IAB node is connected to a source IAB donor before a connection update, and is connected to a target IAB donor after the connection update; and the method includes:

- receiving first indication information; and
- establishing, based on the first indication information, an F1 connection between the DU part of the first IAB node and the target IAB donor.

In this embodiment of this application, the first indication information is used to trigger the DU part of the first IAB node to establish the F1 connection to the target IAB donor in time, thereby reducing a delay.

In a possible implementation, the method further includes:

- changing a cell served by the DU part of the first IAB node from a cell managed by the source IAB donor to a cell managed by the target IAB donor.

In a possible implementation, the receiving first indication information includes:

- receiving the first indication information from the source IAB donor; or
- receiving the first indication information from an operations, administration, and maintenance OAM.

In a possible implementation, the first indication information is an IP address of the target IAB donor; or

- the first indication information includes an IP address of the target IAB donor, and explicit indication information indicating the DU part of the first IAB node to initiate establishment of the F1 connection to the target IAB donor.

In a possible implementation, the receiving the first indication information from an operations, administration, and maintenance OAM includes:

- determining an identifier of a target cell, where the target cell is a cell accessed by the first IAB node after the connection update;
- sending the identifier of the target cell to the operations, administration, and maintenance OAM, so that the operations, administration, and maintenance OAM determines the target IAB donor based on the identifier of the target cell; and
- receiving the first indication information from the operations, administration, and maintenance OAM.

In a possible implementation, the receiving the first indication information from the source IAB donor includes:

- sending a measurement report to the source IAB donor, where the first indication information is determined by the source IAB donor based on the measurement report; and
- receiving the first indication information from the source IAB donor.

In a possible implementation, the receiving the first indication information from the source IAB donor includes:

- executing, by the MT part of the first IAB node, a radio resource control RRC re-establishment process after a radio link failure occurs, to connecting to the target IAB donor after accessing a target cell, where the first indication information is determined by the source IAB donor based on a request message used to request context of the first IAB node, and the request message used to request the context of the first IAB node is sent by the target IAB donor to the source IAB donor; and
- receiving the first indication information from the source IAB donor.

In a possible implementation, the changing a cell served by the DU part of the first IAB node from a cell managed by the source IAB donor to a cell managed by the target IAB donor includes:

- receiving second indication information; and
- changing, based on the second indication information, the cell served by the DU part of the first IAB node from the cell managed by the source IAB donor to the cell managed by the target IAB donor; or
- determining that the descendent UE of the first IAB node and/or the descendent IAB node of the first IAB node receive/receives configuration information; and changing the cell served by the DU part of the first IAB node from the cell managed by the source IAB donor to the cell managed by the target IAB donor, where the configuration information is RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor; or receiving second indication information, and determining that the descendent UE of the first IAB node and/or the descendent IAB node of the first IAB node receive/receives configuration information; and changing the cell served by the DU part of the first IAB node from the cell managed by the source IAB donor to the cell managed by the target IAB donor, where the configuration information is RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor.

In a possible implementation, the receiving second indication information includes:

If the MT part of the first IAB node is still connected to the source IAB donor, the MT part of the first IAB node receives the second indication information carried in a radio resource control RRC message from the source IAB donor.

Alternatively, the DU part of the first IAB node receives, from the source IAB donor, the second indication information carried in an F1 application protocol F1AP message, where the second indication information indicates that the cell served by the DU part of the first IAB node may be changed to the cell managed by the target IAB donor.

In a possible implementation, the receiving second indication information includes:

If the MT part of the first IAB node has been connected to the target IAB donor, the MT part of the first IAB node receives the second indication information carried in a radio resource control RRC message from the target IAB donor, where the second indication information indicates that the cell served by the DU part of the first IAB node may be changed to the cell managed by the target IAB donor; or the DU part of the first IAB node receives the second indication information carried in an F1 application protocol F1AP message from the target IAB donor, where the second indication information indicates that the cell served by the DU part of the first IAB node may be changed to the cell managed by the target IAB donor.

In a possible implementation, the determining that the descendent UE of the first IAB node and/or the descendent IAB node of the first IAB node receive/receives configuration information includes:

receiving, by the DU part of the first IAB node, an F1 application protocol F1AP message from the source IAB donor, where the F1 application protocol F1AP message carries an RRC message container, and an RRC message of the descendent UE of the first IAB node and/or an RRC message of the descendent IAB node of the first IAB node are/is encapsulated in the RRC message container; and if the F1 application protocol F1AP message carries third indication information, after the RRC messages/the RRC message are/is successfully sent to the descendent UE of the first IAB node and/or the descendent IAB node of the first IAB node, determining that the descendent UE of the first IAB node and/or the descendent IAB node of the first IAB node receive/receives the configuration information; or if the F1 application protocol F1AP message is carried in a data packet with a first sequence number, after the RRC messages/the RRC message are/is successfully sent to the descendent UE of the first IAB node and/or the descendent IAB node of the first IAB node, determining that the descendent UE of the first IAB node and/or the descendent IAB node of the first IAB node receive/receives the configuration information, where the first sequence number is a data packet sequence number at a stream control transmission protocol SCTP layer, and is configured by the source IAB donor for the first IAB node.

In a possible implementation, the third indication information is indication information indicating the first IAB node to stop data transmission scheduling on the descendent UE of the first IAB node and/or the descendent IAB node of the first IAB node; or the third indication information indicates that the RRC message carried in the RRC message container includes the RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor, where the cell managed by the target IAB donor is a cell served by the DU part of the first IAB node after the cell served by the DU part of the first IAB node is changed to the cell managed by the target IAB donor.

In a possible implementation, the method further includes:

determining, based on the third indication information carried in the F1 application protocol F1AP message or the F1 application protocol F1AP message carried in the data packet with the first sequence number, that the RRC message of the descendent UE of the first IAB node and/or the RRC message of the descendent IAB node of the first IAB node carried in the F1 application protocol FLAP message include/includes the RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor; and buffering the RRC message of the descendent UE of the first IAB node and/or the RRC message of the descendent IAB node of the first IAB node, and after receiving the second indication information, sending the RRC message of the descendent UE of the first IAB node and/or the RRC message of the descendent IAB node of the first IAB node to the descendent UE of the first IAB node and/or the descendent IAB node of the first IAB node.

In a possible implementation, the method further includes:

broadcasting, by the DU part of the first IAB node, fourth indication information, where the fourth indication information indicates that the descendent UE of the first IAB node and/or the descendent IAB node of the first IAB node make/makes the configuration information effective; or indicating duration information to the descendent UE of the first IAB node and/or the descendent IAB node of the first IAB node, where the duration information indicates a moment at which the descendent UE of the first IAB node and/or the descendent IAB node of the first IAB node make/makes the configuration information effective.

According to a second aspect, an embodiment of this application further provides an IAB node connection update method, applied to a source IAB donor, where a first IAB node is connected to the source IAB donor before a connection update; the first IAB node includes an MT part and a DU part, and is capable of providing access and backhaul services for one or more descendent UEs and/or descendent IAB nodes; the first IAB node is connected to a target IAB donor after the connection update; and the method includes:

determining that the DU part of the first IAB node is to perform the connection update to establish an F1 connection to the target IAB donor; and sending first indication information to the first IAB node, where the first indication information indicates the DU part of the first IAB node to establish the F1 connection to the target IAB donor.

In this embodiment of this application, the first indication information is used to trigger the DU part of the first IAB node to establish the F1 connection to the target IAB donor in time, thereby reducing a delay.

In a possible implementation, the method further includes:

sending second indication information to the first IAB node, where the second indication information indicates that a cell served by the DU part of the first IAB node is to be changed from a cell managed by the source IAB donor to a cell managed by the target IAB donor.

In a possible implementation, the method further includes:

sending a first request message to the target IAB donor, where the first request message is used to request an IP address of the target IAB donor; and receiving a first response message from the target IAB donor, where the first response message includes the IP address of the target IAB donor, where the first indication information is the IP address of the target IAB donor; or the first indication information includes the IP address of the target IAB donor, and explicit indication information indicating the DU part of the first IAB node to initiate establishment of the F1 connection to the target IAB donor.

In a possible implementation, the sending first indication information to the first IAB node includes:

receiving a measurement report from the first IAB node; and determining, by the source IAB donor, the first indication information based on the measurement report; and sending the first indication information to the first IAB node.

In a possible implementation, the sending first indication information to the first IAB node includes:

when the MT part of the first IAB node performs a radio resource control RRC re-establishment process after a radio link failure occurs, to connect to the target IAB donor after accessing a target cell, receiving, from the target IAB donor, a request message used to request context of the first IAB node, and determining the first indication information based on the request message used to request the context of the first IAB node, where the target cell is a cell accessed by the first IAB node after the connection update; and sending the first indication information to the first IAB node.

In a possible implementation, the sending second indication information to the first IAB node includes:

if the MT part of the first IAB node is still connected to the source IAB donor, sending the second indication information carried in a radio resource control RRC message to the MT part of the first IAB node, where the second indication information indicates that the cell served by the DU part of the first IAB node may be changed to the cell managed by the target IAB donor; or sending the second indication information carried in an F1 application protocol F1AP message to the DU part of the first IAB node, where the second indication information indicates that the cell served by the DU part of the first IAB node may be changed to the cell managed by the target IAB donor.

In a possible implementation, the method further includes:

sending the F1 application protocol F1AP message to the DU part of the first IAB node, where the F1 application protocol F1AP message carries an RRC message container and third indication information; an RRC message of the descendent UE of the first IAB node and/or an RRC message of the descendent IAB node of the first IAB node are/is encapsulated in the RRC message container, so that after successfully sending the RRC messages/the RRC message to the descendent UE of the first IAB node and/or the descendent IAB node of the first IAB node, the first IAB node determines that the descendent UE of the first IAB node and/or the descendent IAB node of the first IAB node receive/receives configuration information, where the configuration information is RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor.

In a possible implementation, the third indication information is indication information indicating the first IAB node to stop data transmission scheduling on the descendent UE of the first IAB node and/or the descendent IAB node of the first IAB node; or the third indication information indicates that the RRC message carried in the RRC message container includes the RRC configuration information for accessing the cell managed by the target IAB donor by the descendent UE of the first IAB node and/or the descendent IAB node of the first IAB node, where the cell managed by the target IAB donor is a cell served by the DU part of the first IAB node after the cell served by the DU part of the first IAB node is changed to the cell managed by the target IAB donor.

According to a third aspect, an embodiment of this application provides an IAB node connection update method, applied to a target IAB donor, where a first IAB node is connected to the target IAB donor after a connection update; the first IAB node includes an MT part and a DU part, and is capable of providing access and backhaul services for one or more descendent UEs and/or descendent IAB nodes; the first IAB node is connected to a source IAB donor before the connection update; and the method includes:

determining that the DU part of the first IAB node needs to establish an F1 connection to the target IAB donor; and sending first indication information to the first IAB node, where the first indication information indicates the first IAB node to establish the F1 connection to the target IAB donor.

In a possible implementation, the first indication information is an IP address of the target IAB donor; or the first indication information includes an IP address of the target IAB donor, and explicit indication information indicating the DU part of the first IAB node to initiate establishment of the F1 connection to the target IAB donor.

According to a fourth aspect, an embodiment of this application provides an IAB node connection update method, applied to a descendent node, where the descendent node is descendent UE of a first IAB node and/or a descendent IAB node of the first IAB node; the first IAB node includes an MT part and a DU part, and is capable of providing access and backhaul services for one or more descendent UEs and/or descendent IAB nodes; the first IAB node is connected to a source IAB donor before a connection update, and is connected to a target IAB donor after the connection update; and the method includes:

receiving configuration information from the DU part of the first IAB node, where the configuration information is RRC configuration information for accessing a cell managed by the target IAB donor by the descendent UE of the first IAB node and/or the descendent IAB node of the first IAB node after a cell served by the DU part of the first IAB node is changed to the cell managed by the target IAB donor; and making the information configuration effective.

In a possible implementation, the configuration information includes fifth indication information, and the fifth indication information indicates to delay to make the configuration information effective; and the making the information configuration effective includes:

receiving fourth indication information from the DU part of the first IAB node; and making the information configuration effective based on the fourth indication information.

In a possible implementation, the method further includes:

receiving duration information from the first IAB node, where the duration information indicates a moment at which the descendent node makes the configuration information effective; and the making the information configuration effective includes:

making the information configuration effective based on the moment at which the configuration information is effective.

In a possible implementation, the making the information configuration effective includes:

when the descendent node finds a target cell, making the information configuration effective, where the target cell is a cell served by the DU part of the first IAB node after the cell served by the DU part of the first IAB node is changed to the cell managed by the target IAB donor, and is identified by a target cell identifier in the configuration information.

In a possible implementation, the making the information configuration effective includes:

accessing the target cell based on the configuration information, to establish a connection to the target IAB donor.

According to a fifth aspect, an embodiment of this application provides an IAB node connection update apparatus, used in a first IAB node, where the first IAB node includes an MT part and a DU part, and is capable of providing access and backhaul services for one or more descendent UEs and/or descendent IAB nodes; the first IAB node is connected to a source IAB donor before a connection update, and is connected to a target IAB donor after the connection update; and the apparatus includes:

a first transceiver module, configured to receive first indication information; and a connection module, configured to establish, based on the first indication information, an F1 connection between the DU part of the first IAB node and the target IAB donor.

In a possible implementation, the apparatus further includes:

a change module, configured to change a cell served by the DU part of the first IAB node from a cell managed by the source IAB donor to a cell managed by the target IAB donor.

In a possible implementation, the first transceiver module includes:

a first transceiver submodule, configured to receive the first indication information from the source IAB donor; or a second transceiver submodule, configured to receive the first indication information from an operations, administration, and maintenance OAM.

In a possible implementation, the first indication information is an IP address of the target IAB donor; or the first indication information includes an IP address of the target IAB donor, and explicit indication information indicating the DU part of the first IAB node to initiate establishment of the F1 connection to the target IAB donor.

In a possible implementation, the second transceiver submodule is specifically configured to:

determine an identifier of a target cell, where the target cell is a cell accessed by the first IAB node after the connection update;

send the identifier of the target cell to the operations, administration, and maintenance OAM, so that the operations, administration, and maintenance OAM determines the target IAB donor based on the identifier of the target cell; and receive the first indication information from the operations, administration, and maintenance OAM.

In a possible implementation, the first transceiver submodule is specifically configured to:

send a measurement report to the source IAB donor, where the first indication information is determined by the source IAB donor based on the measurement report; and receive the first indication information from the source IAB donor.

In a possible implementation, the first transceiver submodule is specifically configured to:

execute, by the MT part of the first IAB node, a radio resource control RRC re-establishment process after a radio link failure occurs, to connect to the target IAB donor after accessing a target cell, where the first indication information is determined by the source IAB donor based on a request message used to request context of the first IAB node, and the request message used to request the context of the first IAB node is sent by the target IAB donor to the source IAB donor; and receive the first indication information from the source IAB donor.

In a possible implementation, the change module includes:

a third transceiver submodule, configured to receive second indication information; and a change submodule, configured to change, based on the second indication information, the cell served by the DU part of the first IAB node from the cell managed by the source IAB donor to the cell managed by the target IAB donor; or a first determining module, configured to determine that the descendent UE of the first IAB node and/or the descendent IAB node of the first IAB node receive/receives configuration information; and a change submodule, configured to change the cell served by the DU part of the first IAB node from the cell managed by the source IAB donor to the cell managed by the target IAB donor, where the configuration information is RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor; or a third transceiver submodule, configured to receive second indication information, and determine that the descendent UE of the first IAB node and/or the descendent IAB node of the first IAB node receive/receives configuration information; and a change submodule, configured to change the cell served by the DU part of the first IAB node from the cell managed by the source IAB donor to the cell managed by the target IAB donor, where the configuration information is RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor.

In a possible implementation, the third transceiver submodule is specifically configured to:

if the MT part of the first IAB node is still connected to the source IAB donor, receive the second indication information carried in a radio resource control RRC message from the source IAB donor, where the second indication information indicates that the cell served by the DU part of the first IAB node may be changed to the cell managed by the target IAB donor; or receive the second indication information carried in an F1 application protocol F1AP message from the source IAB donor, where the second indication information indicates that the cell served by the DU part of the first IAB node may be changed to the cell managed by the target IAB donor.

In a possible implementation, the third transceiver submodule is specifically configured to:

if the MT part of the first IAB node has been connected to the target IAB donor, receive the second indication information carried in a radio resource control RRC message from the target IAB donor, where the second indication information indicates that the cell served by the DU part of the first IAB node may be changed to the cell managed by the target IAB donor; or receive the second indication information carried in an F1 application protocol FLAP message from the target IAB donor, where the second indication information indicates that the cell served by the DU part of the first IAB node may be changed to the cell managed by the target IAB donor.

In a possible implementation, the first determining module is specifically configured to:

receive an F1 application protocol F1AP message from the source IAB donor, where the F1 application protocol F1AP message carries an RRC message container, and an RRC message of the descendent UE of the first IAB node and/or an RRC message of the descendent IAB node of the first IAB node are/is encapsulated in the RRC message container; and if the F1 application protocol F1AP message carries third indication information, after the RRC messages/the RRC message are/is successfully sent to the descendent UE of the first IAB node and/or the descendent IAB node of the first IAB node, determine that the descendent UE of the first IAB node and/or the descendent IAB node of the first IAB node receive/receives the configuration information; or if the F1 application protocol F1AP message is carried in a data packet with a first sequence number, after the RRC messages/the RRC message are/is successfully sent to the descendent UE of the first IAB node and/or the descendent IAB node of the first IAB node, determine that the descendent UE of the first IAB node and/or the descendent IAB node of the first IAB node receive/receives the configuration information, where the first sequence number is a data packet sequence number at a stream control transmission protocol SCTP layer, and is configured by the source IAB donor for the first IAB node.

In a possible implementation, the third indication information is indication information indicating the first IAB node to stop data transmission scheduling on the descendent UE of the first IAB node and/or the descendent IAB node of the first IAB node; or the third indication information indicates that the RRC message carried in the RRC message container includes the RRC configuration information for accessing the cell managed by the target IAB donor by the descendent UE of the first IAB node and/or the descendent IAB node of the first IAB node, where the cell managed by the target IAB donor is a cell served by the DU part of the first IAB node after the cell served by the DU part of the first IAB node is changed to the cell managed by the target IAB donor.

In a possible implementation, the apparatus further includes:

a second determining module, configured to determine, based on the third indication information carried in the F1 application protocol F1AP message or the F1 application protocol F1AP message carried in the data packet with the first sequence number, that the RRC message of the descendent UE of the first JAB node and/or the RRC message of the descendent JAB node of the first JAB node carried in the F1 application protocol F1AP message include/includes the RRC configuration information for accessing the cell managed by the target IAB donor by the descendent UE of the first JAB node and/or the descendent JAB node of the first JAB node after the cell served by the DU part of the first JAB node is changed to the cell managed by the target IAB donor; and buffer the RRC message of the descendent UE of the first JAB node and/or the RRC message of the descendent JAB node of the first JAB node, and after the second indication information is received, send the RRC message of the descendent UE of the first JAB node and/or the RRC message of the descendent JAB node of the first JAB node to the descendent UE of the first JAB node and/or the descendent JAB node of the first JAB node.

In a possible implementation, the apparatus further includes:

a broadcasting module, configured to broadcast fourth indication information, where the fourth indication information indicates that the descendent UE of the first JAB node and/or the descendent JAB node of the first JAB node make/makes the configuration information effective; or a second transceiver module, configured to indicate duration information to the descendent UE of the first JAB node and/or the descendent JAB node of the first JAB node, where the duration information indicates a moment at which the descendent UE of the first JAB node and/or the descendent JAB node of the first JAB node make/makes the configuration information effective.

It should be noted that, for beneficial effect of the JAB node connection update apparatus in the fifth aspect and the possible implementations of the fifth aspect, refer to beneficial effect of the corresponding method in the first aspect. Details are not described herein again.

According to a sixth aspect, an embodiment of this application provides an JAB node connection update apparatus, used in a source IAB donor, where a first JAB node is connected to the source IAB donor before a connection update; the first JAB node includes an MT part and a DU part, and is capable of providing access and backhaul services for one or more descendent UEs and/or descendent JAB nodes; the first JAB node is connected to a target IAB donor after the connection update; and the apparatus includes:

a third determining module, configured to determine that the DU part of the first IAB node is to perform the connection update to establish an F1 connection to the target IAB donor; and a third transceiver module, configured to send first indication information to the first IAB node, where the first indication information indicates the DU part of the first IAB node to establish the F1 connection to the target IAB donor.

In a possible implementation, the apparatus further includes:

a fourth transceiver module, configured to send second indication information to the first IAB node, where the second indication information indicates that a cell served by the DU part of the first IAB node is to be changed from a cell managed by the source IAB donor to a cell managed by the target IAB donor.

In a possible implementation, the apparatus further includes:

a fifth transceiver module, configured to send a first request message to the target IAB donor, where the first request message is used to request an IP address of the target IAB donor, where the fifth transceiver module is further configured to receive a first response message from the target IAB donor, where the first response message includes the IP address of the target IAB donor, and the first indication information is the IP address of the target IAB donor; or the first indication information includes the IP address of the target IAB donor, and explicit indication information indicating the DU part of the first IAB node to initiate establishment of the F1 connection to the target IAB donor.

In a possible implementation, the sending first indication information to the first IAB node includes:

receiving a measurement report from the first IAB node; and determining, by the source IAB donor, the first indication information based on the measurement report; and sending the first indication information to the first IAB node.

In a possible implementation, the sending first indication information to the first IAB node includes:

when the MT part of the first IAB node performs a radio resource control RRC re-establishment process after a radio link failure occurs, to connect to the target IAB donor after accessing a target cell, receiving, from the target IAB donor, a request message used to request context of the first IAB node, and determining the first indication information based on the request message used to request the context of the first IAB node, where the target cell is a cell accessed by the first IAB node after the connection update; and sending the first indication information to the first IAB node.

In a possible implementation, the fourth transceiver module is specifically configured to:

if the MT part of the first IAB node is still connected to the source IAB donor, send the second indication information carried in a radio resource control RRC message to the MT part of the first IAB node, where the second indication information indicates that the cell served by the DU part of the first IAB node may be changed to the cell managed by the target IAB donor; or send the second indication information carried in an F1 application protocol F1AP message to the DU part of the first IAB node, where the second indication information indicates that the cell served by the DU part of the first IAB node may be changed to the cell managed by the target IAB donor.

In a possible implementation, the apparatus further includes:

a sixth transceiver module, configured to send the F1 application protocol F1AP message to the DU part of the first IAB node, where the F1 application protocol F1AP message carries an RRC message container and third indication information; an RRC message of the descendent UE of the first IAB node and/or an RRC message of the descendent IAB node of the first IAB node are/is encapsulated in the RRC message container, so that after successfully sending the RRC messages/the RRC message to the descendent UE of the first IAB node and/or the descendent IAB node of the first IAB node, the first IAB node determines that the descendent UE of the first IAB node and/or the descendent IAB node of the first IAB node receive/receives configuration information, where the configuration information is RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor.

In a possible implementation, the third indication information is indication information indicating the first IAB node to stop data transmission scheduling on the descendent UE of the first IAB node and/or the descendent IAB node of the first IAB node; or the third indication information indicates that the RRC message carried in the RRC message container includes the RRC configuration information for accessing the cell managed by the target IAB donor by the descendent UE of the first IAB node and/or the descendent IAB node of the first IAB node, where the cell managed by the target IAB donor is a cell served by the DU part of the first IAB node after the cell served by the DU part of the first IAB node is changed to the cell managed by the target IAB donor.

It should be noted that, for beneficial effect of the IAB node connection update apparatus in the sixth aspect and the possible implementations of the sixth aspect, refer to beneficial effect of the corresponding method in the second aspect. Details are not described herein again.

According to a seventh aspect, an embodiment of this application provides an IAB node connection update apparatus, used in a target IAB donor, where a first IAB node is connected to the target IAB donor after a connection update; the first IAB node includes an MT part and a DU part, and is capable of providing access and backhaul services for one or more descendent UEs and/or descendent IAB nodes; the first IAB node is connected to a source IAB donor before the connection update; and the apparatus includes:

a fourth determining module, configured to determine that the DU part of the first IAB node needs to establish an F1 connection to the target IAB donor; and a seventh transceiver module, configured to send first indication information to the first IAB node, where the first indication information indicates the first IAB node to establish the F1 connection to the target IAB donor.

In a possible implementation, the first indication information is an IP address of the target IAB donor; or the first indication information includes an IP address of the target IAB donor, and explicit indication information indicating the DU part of the first IAB node to initiate establishment of the F1 connection to the target IAB donor.

It should be noted that, for beneficial effect of the IAB node connection update apparatus in the seventh aspect and the possible implementations of the seventh aspect, refer to beneficial effect of the corresponding method in the third aspect. Details are not described herein again.

According to an eighth aspect, an embodiment of this application provides an IAB node connection update apparatus, used in a descendent node, where the descendent node is descendent UE of a first IAB node and/or a descendent IAB node of the first IAB node; the first IAB node includes an MT part and a DU part, and is capable of providing access and backhaul services for one or more descendent UEs and/or descendent IAB nodes; the first IAB node is connected to a source IAB donor before a connection update, and is connected to a target IAB donor after the connection update; and the apparatus includes:

an eighth transceiver module, configured to receive configuration information from the DU part of the first IAB node, where the configuration information is RRC configuration information for accessing a cell managed by the target IAB donor by the descendent UE of the first IAB node and/or the descendent IAB node of the first IAB node after a cell served by the DU part of the first IAB node is changed to the cell managed by the target IAB donor; and an activation module, configured to make the configuration information effective.

In a possible implementation, the configuration information includes fifth indication information, and the fifth indication information indicates to delay to make the configuration information effective; and the activation module is specifically configured to:

receive fourth indication information from the DU part of the first IAB node; and make the configuration information effective based on the fourth indication information.

In a possible implementation, the apparatus further includes:

a ninth transceiver module, configured to receive duration information from the first IAB node, where the duration information indicates a moment at which the descendent UE of the first IAB node and/or the descendent IAB node of the first IAB node make/makes the configuration information effective, where the activation module is specifically configured to:

make the configuration information effective based on the moment at which the configuration information is effective.

In a possible implementation, the activation module is specifically configured to:

when the descendent node finds a target cell, make the configuration information effective, where the target cell is a cell served by the DU part of the first IAB node after the cell served by the DU part of the first IAB node is changed to the cell managed by the target IAB donor, and is identified by a target cell identifier in the configuration information.

In a possible implementation, the activation module is specifically configured to:

access the target cell based on the configuration information, to establish a connection to the target IAB donor.

It should be noted that, for beneficial effect of the IAB node connection update apparatus in the eighth aspect and the possible implementations of the eighth aspect, refer to beneficial effect of the corresponding method in the fourth aspect. Details are not described herein again.

According to a ninth aspect, an embodiment of this application provides an IAB node connection update apparatus, including at least one processor. The processor is configured to execute a program stored in a memory. When the program is executed, the IAB node connection update apparatus performs:

the method in the first aspect and the possible implementations of the first aspect;

the method in the second aspect and the possible implementations of the second aspect;

the method in the third aspect and the possible implementations of the third aspect; or the method in the fourth aspect and the possible implementations of the fourth aspect.

According to a tenth aspect, an embodiment of this application provides a computer program product including instructions. When the computer program product runs on a computer, the computer is enabled to perform the method in the first aspect and the possible implementations of the first aspect, the method in the second aspect and the possible implementations of the second aspect, the method in the third aspect and the possible implementations of the third aspect, or the method in the fourth aspect and the possible implementations of the fourth aspect.

According to an eleventh aspect, an embodiment of this application provides a computer-readable storage medium, where the computer-readable storage medium stores a computer program. When the computer program is executed by a processor, the method in the first aspect and the possible implementations of the first aspect is performed, the method in the second aspect and the possible implementations of the second aspect is performed, the method in the third aspect and the possible implementations of the third aspect is performed, or the method in the fourth aspect and the possible implementations of the fourth aspect is performed.

BRIEF DESCRIPTION OF DRAWINGS

To describe technical solutions in embodiments of this application more clearly, the following briefly describes accompanying drawings in embodiments. Apparently, the accompanying drawings in the following description show merely some embodiments of this application, and persons of ordinary skill in the art may derive other accompanying drawings from these accompanying drawings without creative efforts.

DESCRIPTION OF EMBODIMENTS

Figure 1:
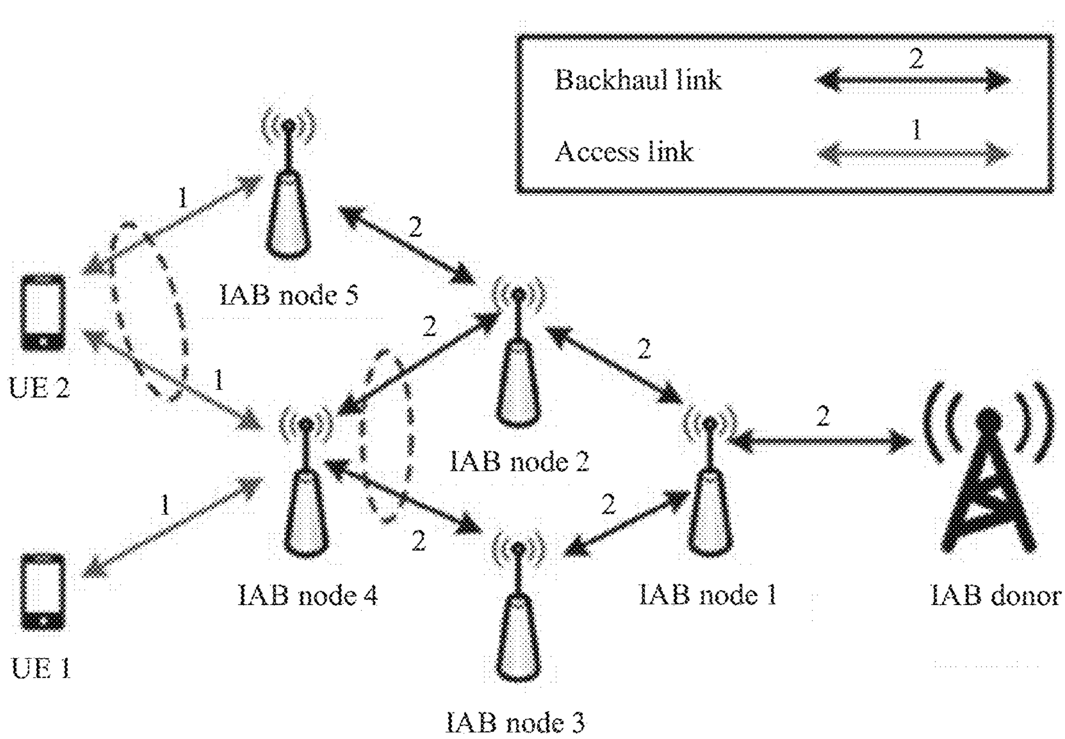
FIG. 1 is a schematic diagram of standalone IAB networking in a possible implementation.

To make objectives, technical solutions, and advantages of embodiments of this application clearer, the following describes specific implementations of embodiments of this application in detail with reference to accompanying drawings.

It should be noted that, the term "and/or" in this application describes only an association relationship for describing associated objects and represents that three relationships may exist. For example, A and/or B may represent the following three cases: Only A exists, both A and B exist, and only B exists. In the specification and claims in embodiments of this application, the terms "first", "second", "third", and the like are intended to distinguish between different objects, but are not used to describe a particular order of the objects. For example, a first transceiver module, a second transceiver module, a third transceiver module, and the like are used to distinguish between different transceiver modules, but are not used to describe a particular order of the target objects. In embodiments of this application, the word "example" or "for example" is used to represent giving an example, an illustration, or a description. Any embodiment or design scheme described by using "example" or "for example" in embodiments of this application shall not be construed as having more advantages than another embodiment or design scheme. Exactly, use of the word "example", "for example", or the like is intended to present a related concept in a specific manner. In descriptions of embodiments of this application, unless otherwise stated, "a plurality of" means two or more than two.

In an integrated access and backhaul (Integrated access and backhaul, IAB) network, an IAB node (IAB node), also referred to as a relay node (Relay Node, RN), may provide a radio access service for user equipment (User Equipment, UE). Service data of the UE is transmitted by the IAB node connected to an IAB donor (IAB donor) via a wireless backhaul link. In this application, the IAB donor may also be referred to as a donor node (donor node) or a donor gNodeB (Donor gNodeB, DgNB). The IAB node may include a mobile terminal (mobile termination, MT) (or referred to as an MT of the IAB node or an IAB-MT) part and a distributed unit (distributed unit, DU) (or referred to as a DU of the IAB node or an IAB-DU) part. When the IAB node is oriented to a parent node of the IAB node, the IAB node may serve as a terminal device, that is, a role of the MT. When the IAB node is oriented to a child node of the IAB node (the child node may be another IAB node or common UE), the IAB node is considered as a network device, that is, a role of the DU. The MT part of the IAB node has all or some functions of the UE. The IAB donor may be an access network element having a complete base station function, or may be an access network element in a form in which a central unit (central unit, CU) is separated from a distributed unit (distributed unit, DU). The IAB donor is connected to a core network (for example, connected to 5G core, 5GC) element serving the UE, and provides a wireless backhaul function for the IAB node. For ease of description, the central unit of the IAB donor is briefly referred to as a donor CU (or referred to as a CU of the IAB donor, an IAB-donor-CU, or an IAB donor CU, or directly referred to as a CU), and the distributed unit of the IAB donor is briefly referred to as a donor DU (or referred to as a DU of the IAB donor, an IAB-donor-DU, or an IAB donor DU, or directly referred to as a DU). The CU of the IAB donor may alternatively be in a form in which a control plane (control plane, CP) is separated from a user plane (user plane, UP). For example, the CU of the IAB donor may include one CU-CP (or referred to as an IAB donor CU-CP or an IAB-donor-CU-CP) and one (or more) CU-UP (or referred to as an IAB donor CU-UP or an IAB-donor-CU-UP).

In a current 5G standard, in consideration of small coverage of high-frequency carriers, multi-hop networking may be used in the IAB network, to ensure network coverage performance. In addition, in consideration of a requirement of service transmission reliability, the IAB node may be designed to support dual connectivity (Dual connectivity, DC) or multi-connectivity (multi-connectivity), to cope with potential exceptions occurring on backhaul links, for example, link interruption or blockage (blockage) and load fluctuation, to improve transmission reliability. Therefore, the IAB network supports multi-hop networking, and may further support multi-connectivity networking. There is at least one transmission path including a plurality of links between the UE served by the IAB node and the IAB donor. There are a plurality of nodes on one transmission path such as UE, one or more IAB nodes, and an IAB donor (if the IAB donor is in a form in which a CU is separated from a DU, the IAB donor further includes an IAB-donor-DU part and an IAB-donor-CU part). Each IAB node considers an adjacent node that provides access and backhaul services for the IAB node as a parent node of the IAB node. Accordingly, the IAB node may be considered as a child node of the parent node.

For example, as shown in FIG. 1, a parent node of an IAB node 1 is an IAB donor, the IAB node 1 is a parent node of an IAB node 2 and an IAB node 3, both the IAB node 2 and the IAB node 3 are parent nodes of an IAB node 4, and a parent node of an IAB node 5 is the IAB node 2. An uplink data packet of UE may be transmitted to the IAB donor through one or more IAB nodes, and then sent by the IAB donor to a mobile gateway device (for example, a user plane function UPF in a 5G core network). A downlink data packet is received by the IAB donor from the mobile gateway device, and then sent to the UE via the IAB node. FIG. 1 shows a standalone (standalone, SA) IAB networking scenario. Both the IAB node and the UE establish connections to a network only through NR air interfaces.

The standalone IAB networking scenario shown in FIG. 1 is merely an example. As shown in FIG. 1, a path numbered 1 represents an access link, and a path numbered 2 represents a backhaul link. In an IAB scenario in which multi-hop and multi-connectivity are combined, there are more possibilities. For example, the IAB donor in FIG. 1 and an IAB node managed by another IAB donor form dual connectivity to serve the UE (to be specific, the UE supports dual connectivity. A connection 1 is for directly connecting to a cell served by an IAB donor DU, and a connection 2 is for establishing a connection to an IAB node X. The IAB donor connected to the IAB node X is different from the IAB donor corresponding to the connection 1 of the UE). This is not enumerated in this application.

Figure 2:
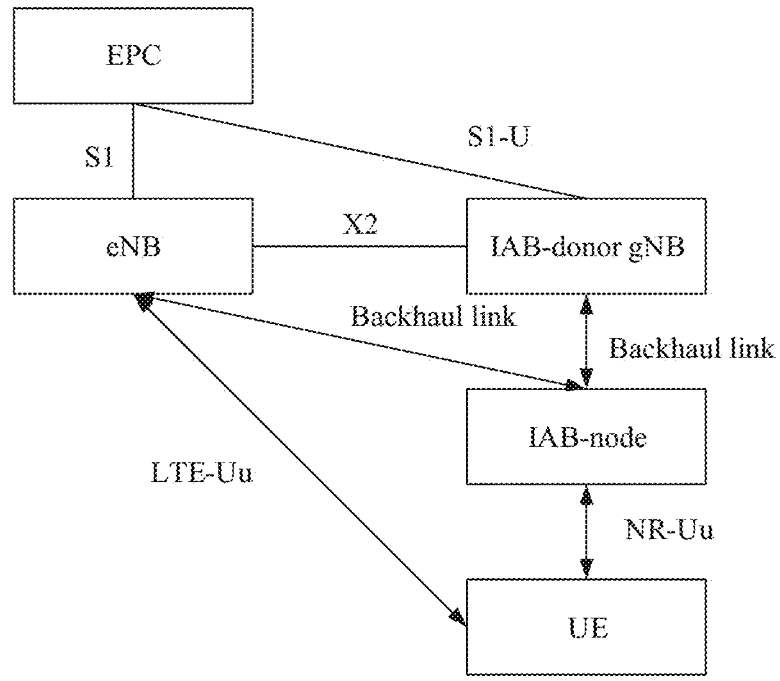
FIG. 2 is a schematic diagram of non-standalone IAB networking in a possible implementation.

As shown in FIG. 2, the IAB network further supports non-standalone (non-standalone, NSA) networking. Refer to FIG. 2. An IAB node supports dual connectivity of 4G and 5G networks, that is, EN-DC (E-UTRAN NR Dual Connectivity). An LTE eNB (eNB) is a master eNB (Master eNB, MeNB), provides an LTE air interface (LTE Uu) connection for the IAB node, and establishes an S1 interface with evolved packet core (evolved packet core, EPC) of a 4G core network to perform user plane transmission and control plane transmission. An IAB donor gNB is a secondary gNB, provides an NR air interface (NR Uu) connection for the IAB node, and establishes an S1 interface with the EPC of the core network to perform user plane transmission. Similarly, UE also supports EN-DC. The UE is connected to the master eNB (eNB) through the LTE Uu interface, and is connected to the secondary gNB IAB node through the NR Uu interface. The secondary gNB of the UE may alternatively be the IAB donor gNB.

It should be noted that FIG. 2 is merely an example of non-standalone networking. An NSA IAB networking scenario also supports multi-hop IAB networking. For example, the UE in FIG. 2 may be another IAB node. To be specific, the IAB node may be connected to the IAB donor gNB over a multi-hop wireless backhaul link. The non-standalone IAB networking scenario in this application may also be referred to as an IAB EN-DC networking scenario.

In a possible implementation, it is determined that a new protocol layer, namely, backhaul adaptation protocol (backhaul adaptation protocol, BAP) layer, is introduced in the wireless backhaul link of the IAB network. The protocol layer is located on top of a radio link control (radio link control, RLC) layer, and may be used to implement functions such as routing and bearer mapping of a data packet over the wireless backhaul link.

Figure 3:
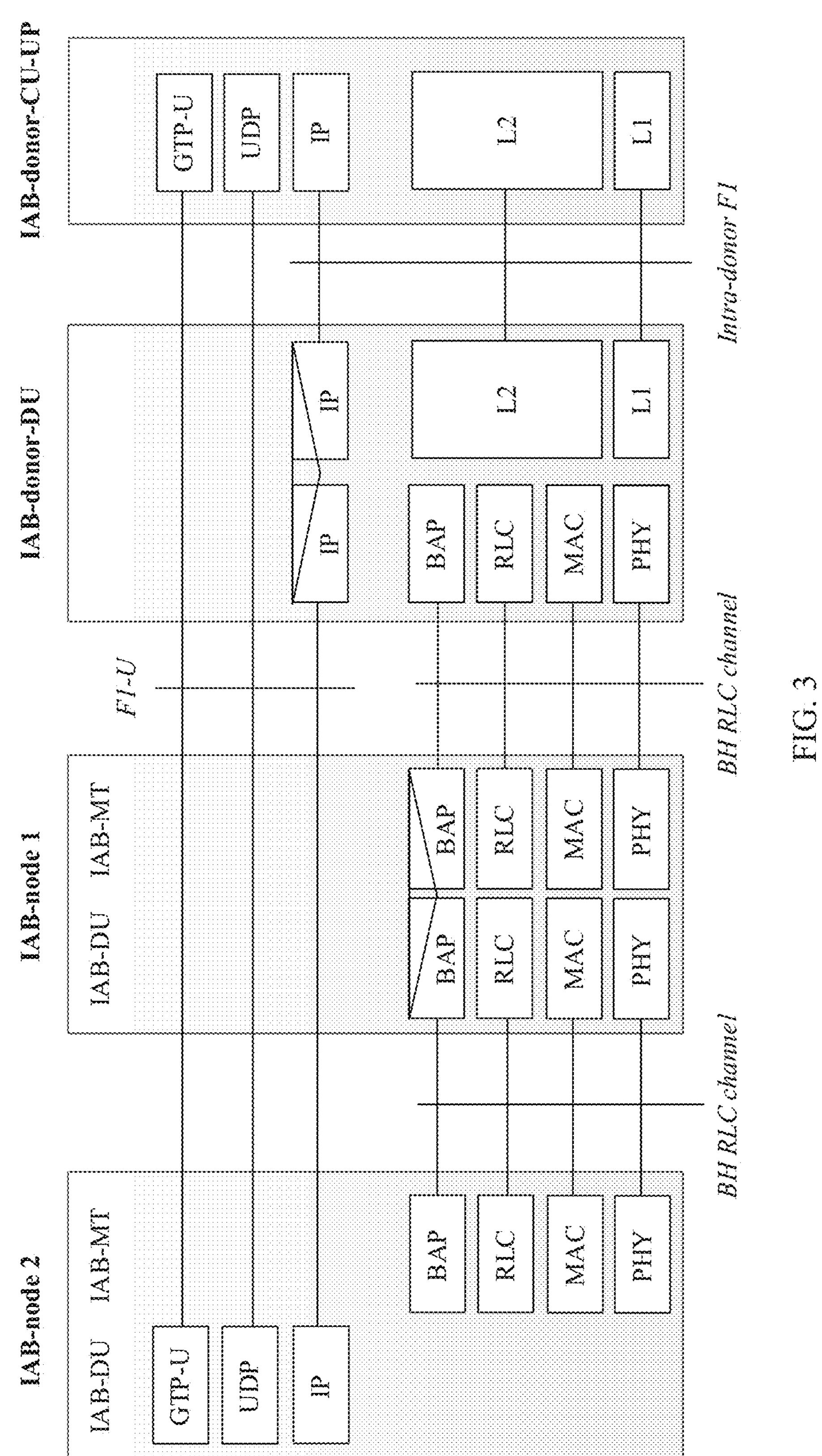
FIG. 3 is a schematic diagram of an IAB network user plane protocol stack according to an embodiment of this application.
Figure 4:
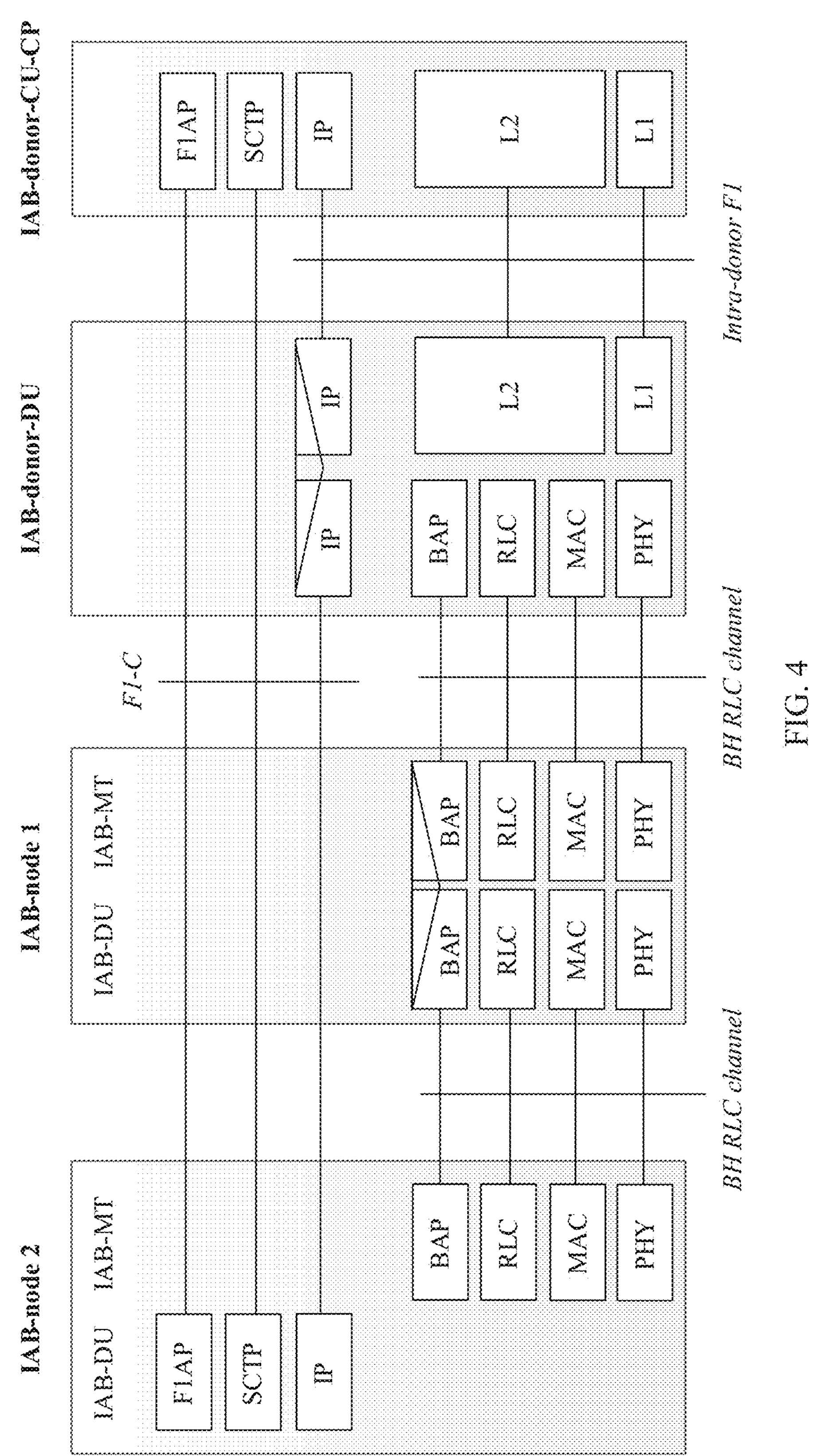
FIG. 4 is a schematic diagram of an IAB network control plane protocol stack according to an embodiment of this application.

An F1 interface (or referred to as an F1* interface, which may be collectively referred to as the F1 interface in this application, but a name is not limited) needs to be established between the IAB node (the DU part of the IAB node) and the IAB donor (or the donor CU). The F1 interface supports a user-plane protocol stack (F1-U/F1*-U) and a control-plane protocol stack (F1-C/F1*-C). The user-plane protocol stack includes one or more of the following protocol layers: a general packet radio service (General Packet Radio Service, GPRS) tunneling protocol user plane (GPRS tunneling protocol user plane, GTP-U) layer, a user datagram protocol (user datagram protocol, UDP) layer, and an internet protocol (internet protocol, IP) layer. Refer to FIG. 3. The control-plane protocol stack of the F1 interface includes one or more of the following protocol layers: an F1 application protocol (F1 application protocol, F1AP) layer, a stream control transmission protocol (stream control transmission protocol, SCTP) layer, and an IP layer. Refer to FIG. 4.

Interface management, IAB-DU management, UE context-related configuration, and the like can be performed between the IAB node and the IAB donor by using a control plane of the F1/F1* interface. Functions such as user plane data transmission and downlink transmission status feedback can be performed between the IAB node and the IAB donor by using a user plane of the F1/F1* interface.

In a possible implementation, each IAB node and a parent node of the IAB node are connected to a same IAB donor, and each IAB-MT and each IAB-DU may be considered to be managed by the same IAB donor. Therefore, topology management, route configuration, quality of service (Quality of Service, QoS) management, and the like in an IAB network formed by IAB nodes managed by an IAB donor are all controlled by the IAB donor (which may be specifically an IAB-donor-CU or an IAB-donor-CU-CP). For example, in the standalone networking scenario shown in FIG. 1, in a process in which each IAB node accesses the network, the IAB donor (which may be specifically an IAB-donor-CU or an IAB-donor-CU-CP) may learn that the IAB node accesses the network via a specific parent node. If the IAB donor is in a form in which the CU is separated from a DU, the IAB donor may further know the specific IAB-donor-DU (namely, an IAB-donor-DU connected to the parent node) connected to the IAB node. Subsequently, if a topology is updated for the IAB node (for example, a new parent node is added, or the parent node is changed), the topology is updated under control of the IAB donor (which may be specifically the IAB-donor-CU or the IAB-donor-CU-CP). In other words, the IAB donor may know a status of the network topology formed by all the IAB nodes managed by the IAB donor and the IAB-donor-DU. Therefore, the IAB-donor-CU manages identifiers and route configuration of the IAB nodes in a centralized manner. The foregoing identifier management includes allocation of a BAP address of the IAB node/IAB-donor-DU and allocation of a BAP path ID configured for each routing path. A specific transmission path from an IAB node A to an IAB node B may be uniquely identified by a BAP routing ID. Each BAP routing ID includes a BAP address part of a target IAB node and a BAP path ID part of a path label.

In the foregoing possible implementation, it is considered that only a data packet passing through IAB nodes is transmitted on a backhaul link between the IAB nodes controlled by one IAB donor. Therefore, it can be ensured that a BAP routing ID part of routing information in a BAP layer header carried in the data packet can uniquely identify a transmission path to one target IAB node, and a BAP address conflict and/or an entire BAP routing ID conflict do/does not occur. The BAP address conflict is a conflict in which one BAP address may be considered by one or more IAB nodes to identify two or more different target IAB nodes. The BAP routing ID conflict is a conflict in which one BAP routing ID is considered by one or more IAB nodes to identify two or more different transmission paths. The one or more IAB nodes herein are specifically IAB-donor-DUs or the IAB nodes.

In the foregoing possible implementation, only a scenario in which all IAB nodes are connected to a same IAB donor is considered. However, when an IAB node can be connected to a plurality of IAB donors, or when an MT part and a DU part of an IAB node are not managed by a same IAB donor, a service of the IAB node or a service of UE connected to the IAB node may need to be transmitted through several different types of nodes, and the different types of nodes may include an IAB node managed by an IAB donor CU 1 (in other words, both an IAB-MT and an IAB-DU are managed by the IAB donor CU 1), an IAB node jointly managed by the IAB donor CU 1 and an IAB donor CU 2 (an IAB-MT and an IAB-DU are respectively connected to two different IAB donor CUs), and an IAB node managed by the IAB donor CU 2 (in other words, both an IAB-MT and an IAB-DU are managed by the IAB donor CU 2). It should be noted that, in embodiments of this application, there are only two different IAB donor CUs: the IAB donor CU 1 and the IAB donor CU 2. However, in an actual situation, in the nodes through which the foregoing service passes, an IAB node controlled by another IAB donor CU (for example, an IAB donor CU 3) or an IAB node jointly managed by two other IAB donor CUs may be further included in a path.

In this inter-donor networking case, IAB nodes and IAB-donor-DUs managed by different donors may be connected to each other through one or more backhaul links (Backhaul Links). When the different IAB donors configure BAP layer node identifiers (BAP addresses) or routing identifiers (BAP routing IDs) for the IAB nodes controlled/managed by the different IAB donors, the different IAB donors may configure a same BAP address for the different IAB nodes, or configure a same BAP routing ID for different paths, that is, the BAP address conflict or BAP routing ID conflict occurs. As a result, when receiving a data packet including a BAP routing ID, one or more IAB nodes cannot determine a target IAB node of the data packet and a routing path indicated by the BAP routing ID. This may cause the data packet to fail to be transmitted correctly in a routing manner.

Figure 5:
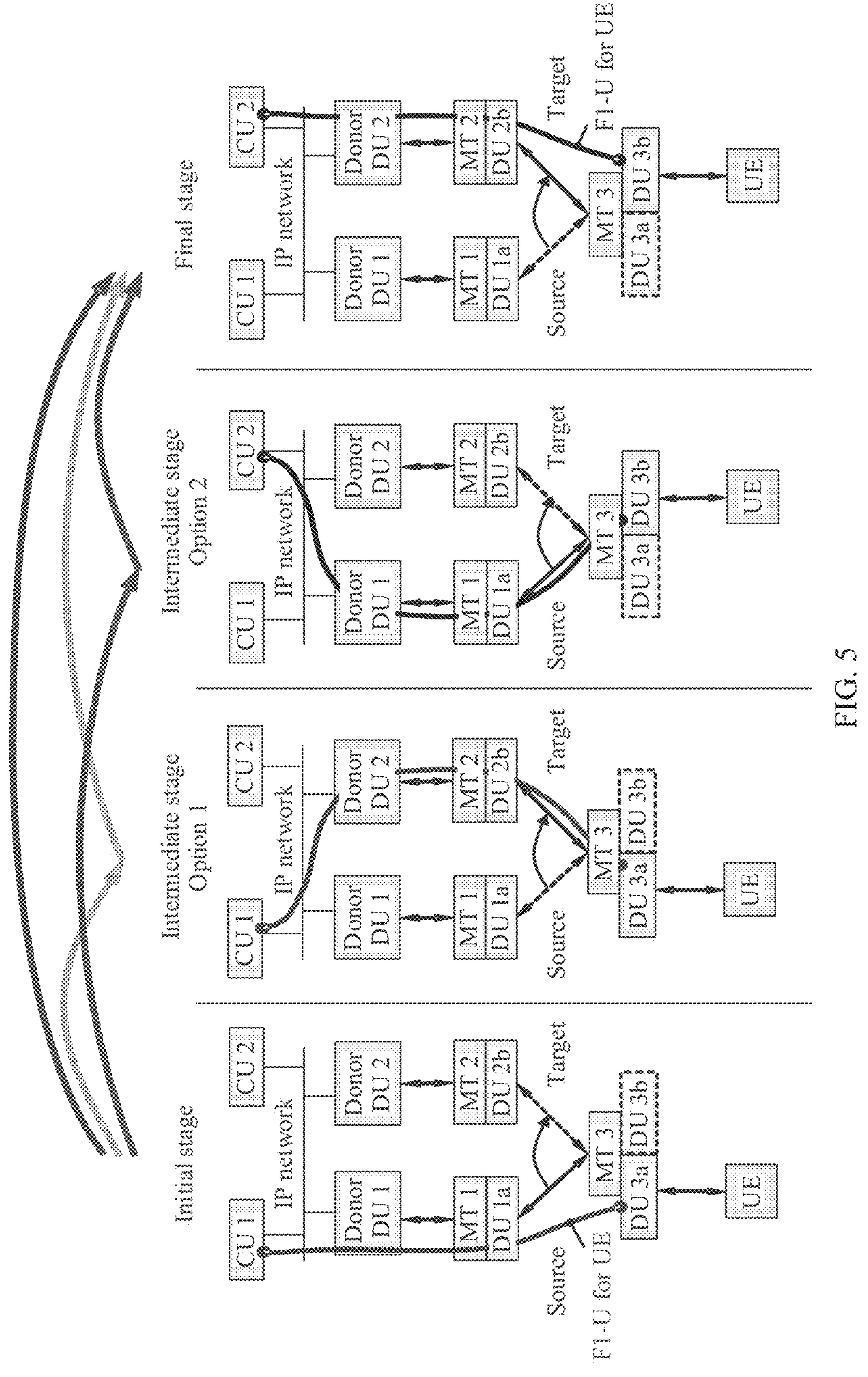
FIG. 5 is a schematic diagram of a scenario in which an IAB node performs inter-donor topology update switching according to an embodiment of this application.

For the foregoing problem, an embodiment of this application provides an IAB node connection update method. The method is applicable to a scenario in which an IAB node performs inter-donor topology update switching and that is shown in FIG. 5 provided in this embodiment of this application. In this scenario, after a connection between an IAB node 3 and a source IAB donor CU 1 is updated to a connection between the IAB node 3 and a target IAB donor CU 2, an MT part of the IAB node 3, namely, an MT 3, needs to access a new parent node, and a DU part of the IAB node 3, for example, a DU3*b*, also needs to establish a connection to a new IAB donor, namely, the target IAB donor CU 2. It should be noted that, in actual deployment, there may be only one DU in one IAB node, and in a topology update process, the IAB-DU needs to establish an F1 connection to a target donor CU.

It should be noted that the connection between the IAB node 3 and the source IAB donor CU 1 is updated to the connection between the IAB node 3 and the target IAB donor CU 2 may be that the connection between the IAB node 3 and the source IAB donor CU 1 is switched to the connection between the IAB node 3 and the target IAB donor CU 2, or may be that after a radio link failure (Radio link failure, RLF) occurs on a wireless backhaul link, the IAB node 3 selects a cell managed by the new IAB donor when performing link recovery, and successfully performs radio resource control (Radio Resource Control, RRC) re-establishment, so that the IAB node 3 and the source IAB donor CU 1 may update transport layer association used for bearing a F1 connection between the IAB node 3 and the source IAB donor CU 1 and perform IPsec security negotiation again, or the IAB node 3 may establish a new transport layer association with a new IAB donor CU, namely, the target IAB donor CU 2 and negotiate a new IPsec security mechanism to establish the F1 connection.

Embodiments of this application is applicable to an IAB network in standalone networking (SA), and is also applicable to an IAB network in non-standalone networking (NSA).

Figure 6:
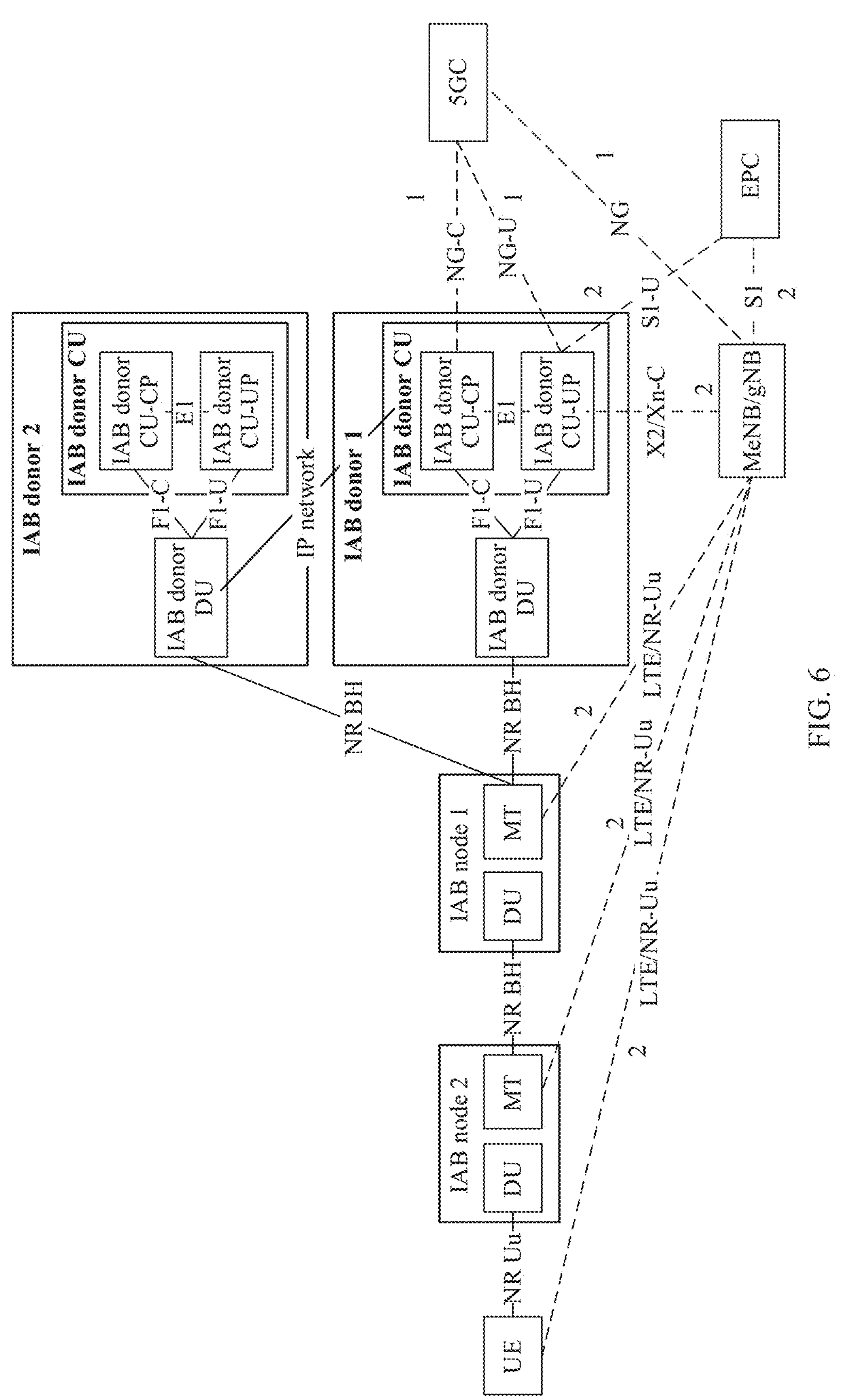
FIG. 6 is an architectural diagram in which an IAB node is connected to an IAB donor over a wireless backhaul link according to an embodiment of this application.

FIG. 6 is an architectural diagram in which an IAB node is connected to an IAB donor over a wireless backhaul link according to an embodiment of this application. The foregoing IAB node connection update method is applicable to the architectural diagram shown in FIG. 6. When the IAB node works in an SA mode, the IAB node may be connected to one parent node or dually connected to two parent nodes. The two parent nodes may be controlled by a same IAB donor or respectively controlled by different IAB donors. An F1 interface needs to be established between a DU part of the IAB node and one IAB donor. The IAB donor may be connected to 5G core (5G core, 5GC), namely, a dashed line part marked 1 in FIG. 6. An IAB-donor-CU-CP is connected to a control plane network element (for example, an access and mobility management AMF function) in the 5GC through an NG control plane interface. An IAB-donor-CU-UP is connected to a user plane network element (for example, a user plane function UPF) in the 5GC through an NG user plane interface. When the IAB node works in an NSA mode (or an EN-DC mode), the IAB-donor-CU-UP may be connected to EPC (for example, connected to a serving gateway (serving gateway, SGW)) through an S1 user plane interface. A MeNB is connected to an MT of the IAB node through an LTE Uu air interface. The MeNB is connected to the IAB-donor-CU-CP through an X2-C interface. The MeNB is connected to the EPC through an S1 interface (including an S1 interface user plane and an S1 interface control plane), namely, a dashed line part marked 2 in FIG. 6.

In a possible implementation, the MeNB in FIG. 6 may alternatively be replaced with a 5G gNB (gNB), and the LTE-Uu interface in FIG. 6 is correspondingly replaced with an NR-Uu interface. A user plane interface and/or a control plane interface may be established between the gNB and the 5GC. The gNB and the IAB-donor provide dual connectivity for the IAB node. The gNB may serve as a master node of the IAB node or a secondary node of the IAB node.

Figure 7:
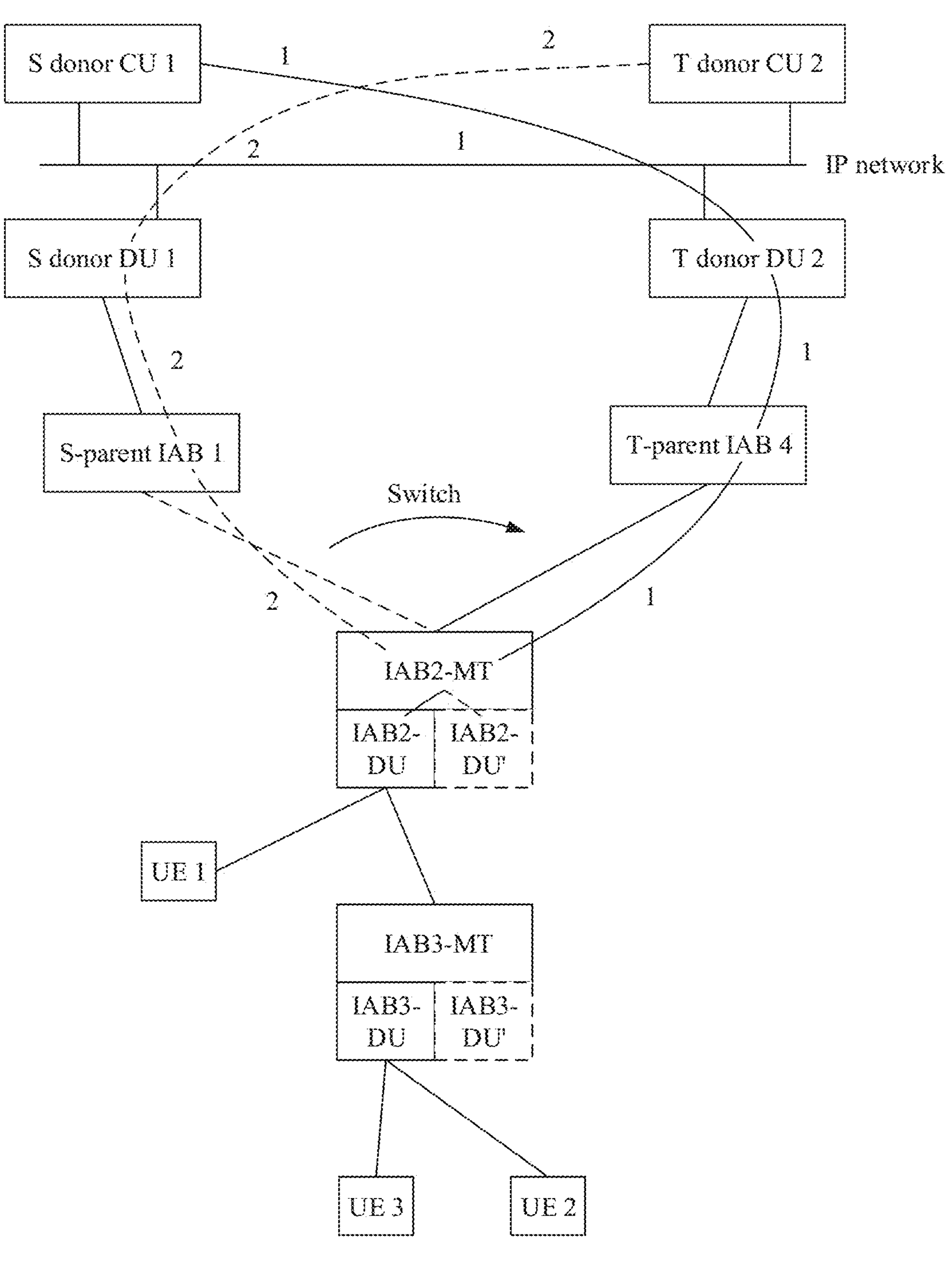
FIG. 7 is a schematic diagram of a topology update between IAB donors according to an embodiment of this application.

FIG. 7 is a schematic diagram of a topology update between IAB donors. As shown in FIG. 7, a to-be-switched node is an IAB node 2 (briefly referred to as an IAB 2), namely, a first IAB node mentioned below. The IAB node 2 is capable of providing access and backhaul services for one or more UEs/child nodes. In FIG. 7, UE 1 accessing a cell served by a DU part of the IAB node 2 and a child node IAB node 3 (also referred to as a descendent IAB node of the IAB node 2) are shown. There are further two UEs managed by the IAB node 3, that is, UE 2 and UE 3, that access a cell served by a DU part of an IAB node 4. It may be understood that in an actual network deployment scenario, the IAB node 2 may further have one or more grandchildren nodes, and the IAB node 3 may further serve more UEs, child nodes, or grandchildren nodes, which are not shown one by one in FIG. 7.

For ease of description, these IAB nodes or UEs connected to an IAB donor through the IAB node 2 are referred to as descendent nodes of the IAB node 2, that is, descendent IAB nodes and/or descendent UEs. In this application, a grandchild node of a node may be a descendent node connected to the node through at least two hops of wireless links. For example, in the example shown in FIG. 1, the IAB node 5 may be considered as a grandchild node of the IAB node 1.

The IAB node 2 is connected to a target parent node (namely, a T parent IAB node 4 shown in FIG. 7) after performing switching from a source parent node (namely, an S parent IAB node 1 shown in FIG. 7). Then, the descendent IAB node 3 of the IAB node 2, the UE 1, and the UE 2 may also perform switching along with the IAB node 2.

In a process in which an IAB node performs inter-IAB-donor switching, because both the IAB node and a descendent node of the IAB node need to switch and be connected to a new IAB donor, there are many possible execution sequences, for example, from top to bottom, from bottom to top, or in any sequence. Therefore, in an entire process of migrating the IAB node, descendent UE, and the descendent IAB node, a case in which an MT part and a DU part of one IAB node are respectively connected to two different IAB donors may occur. For example, in a scenario shown in FIG. 7, when switching of an IAB2-MT is completed, the MT part of the IAB node 2 is already connected to a target IAB donor CU 2, that is, an IAB donor mentioned below. However, the IAB2-DU part is still connected to a source IAB donor CU 1, that is, a source IAB donor mentioned below, and the descendent node (IAB node 3) of the IAB node 2 and UEs (UE 1, UE 2, UE 3) are also still connected to the IAB donor CU 1. In this case, when the IAB node 3 needs to communicate with the IAB donor CU 1, a related data packet needs to be transmitted through a path shown by a solid line 1, that is, through the IAB node 2 (which is a node jointly managed by the two IAB donors), and the IAB node 4 and an IAB donor DU 2 (both are nodes managed by the IAB donor CU 2). In addition, the related data packet further needs to be transmitted via an IP transport network between the IAB donor DU 2 and the IAB donor CU 1.

In this application, that an IAB node performs an inter-IAB-donor connection update may also be understood as follows: The IAB node performs a connection update between two different IAB donors. To be specific, an IAB donor to which the IAB node is connected before the connection update is different from a target IAB donor to which the IAB node is connected after the connection update. The connection update herein may be a connection update based on switching of the IAB node, or a connection update based on link recovery (such as RRC re-establishment) performed by an MT part of the IAB node.

In addition to a scenario in which the IAB node 2 is switched, the topology update shown in FIG. 7 is further applicable to a scenario in which the IAB node 2 accesses the cell served by the IAB node 4 (which may be specifically the DU part of the IAB node 4) when performing link recovery in a case of a backhaul link failure. Then, the MT part of the IAB node 2 may perform an RRC re-establishment process with the IAB donor CU 2.

Embodiment 1

FIG. 8(*a*) is a schematic flowchart of an IAB node connection update method according to an embodiment of this application. The schematic flowchart includes S802 to S806.

Figures 8A, 8B, 8C:
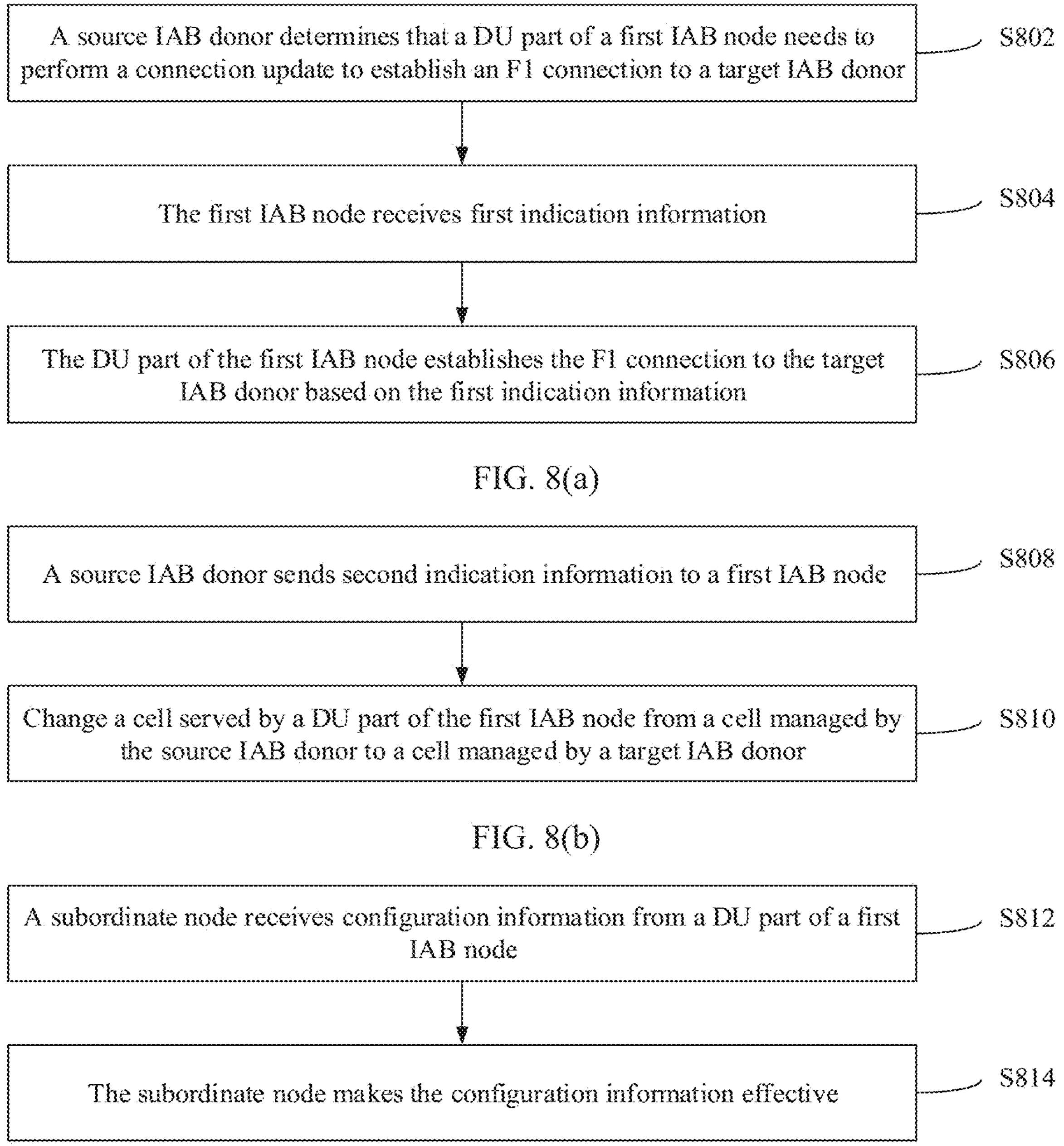
FIG. 8(*a*) to FIG. 8(*c*) are schematic flowcharts of an IAB node connection update method according to an embodiment of this application.

The following describes in detail the IAB node connection update method shown in FIG. 8*a* provided in this embodiment of this application. In this embodiment of this application, the IAB node connection update method may be applied to a first IAB node, a source IAB donor, a target IAB donor, and a descendent node, namely, descendent UE of the first IAB node and/or a descendent IAB node of the first IAB node. The first IAB node includes an MT part and a DU part, and is capable of providing access and backhaul services for one or more descendent UEs and/or descendent IAB nodes. The first IAB node is connected to the source IAB donor before a connection update, and is connected to the target IAB donor after the connection update.

In a possible implementation, the IAB node connection update method shown in FIG. 8(*a*) provided in this embodiment of this application is implemented by using the following steps:

S802: The source IAB donor determines that the DU part of the first IAB node needs to perform the connection update to establish an F1 connection to the target IAB donor.

In this embodiment of this application, in a possible implementation, the first IAB node sends a measurement report to the source IAB donor. The source IAB donor receives the measurement report. The source IAB donor determines, based on a relationship between signal quality in the measurement report and a preset signal quality threshold, whether the first IAB node performs inter-IAB-donor switching. For example, when signal quality of a cell A that is managed by the source IAB donor and that is accessed by the first IAB node in the measurement report is less than a preset signal quality threshold TH1, and signal quality of a cell B that is managed by the target IAB donor and that is measured by the first IAB node is greater than a preset signal quality threshold TH2, the source IAB donor determines that the first IAB node needs to perform inter-IAB-donor switching, and the DU part of the first IAB node needs to perform the connection update to establish the F1 connection to a new IAB donor, namely, the target IAB donor.

In this embodiment of this application, in another possible implementation, when the MT part of the first IAB node performs a radio resource control RRC re-establishment process after a radio link failure occurs, to connect to the target IAB donor after accessing a target cell, the target IAB donor sends, to the source IAB donor, a request message used to request context of the first IAB node. The source IAB donor determines, based on the request message, that the DU part of the first IAB node needs to perform the connection update to establish the F1 connection to the new IAB donor, namely, the target IAB donor.

It should be noted that in this embodiment of this application, a process in which the DU part of the first IAB node performs the connection update to establish the F1 connection to the target IAB donor includes establishment of an F1 interface between the DU part of the first IAB node and the target IAB donor, and may further include a process of establishing a stream control transmission protocol (Stream control transmission protocol, SCTP) association (or referred to as a transport network layer (Transport Network Layer) association) between the DU part of the first IAB node and the target IAB donor, and/or performing security negotiation between the DU part of the first IAB node and the target IAB donor (for example, an IPSec-protocol-based security mechanism and a parameter negotiation process).

It should be further noted that the DU part of the first IAB node may establish the F1 connection to the target IAB donor (which may be specifically a target IAB donor CU or CU-CP) before the MT part of the first IAB node performs inter-IAB-donor switching. An example in which the IAB 2 in FIG. 7 is the first IAB node is used. The DU part (namely, the IAB2-DU) of the IAB 2 may perform a process of establishing an F1 connection to the CU (namely, the target IAB donor CU 2 in FIG. 7) of the target IAB donor before the MT part (namely, the IAB2-MT) of the IAB 2 performs switching. In this case, the IAB2-DU needs to establish the F1 connection to the target IAB donor CU 2 through the source parent IAB node 1 and a source IAB donor DU 1, namely, a transmission path indicated by a dashed line 2 in FIG. 7. The IAB2-DU may alternatively establish the F1 connection to the target IAB donor CU 2 after the IAB2-MT performs switching. In this case, the IAB2-DU may establish the F1 connection to the target IAB donor CU 2 through a transmission path including the target parent node IAB node 4 and the target IAB donor DU 2. Considering that the IAB node 2 may need to simultaneously maintain two different F1 connections to the source IAB donor CU 1 and the target IAB donor CU 2, the DU part of the IAB node 2 may have a plurality of different logical DUs, for example, the IAB2-DU and an IAB2-DU' in FIG. 7. The IAB2-DU maintains an F1 connection to the source IAB donor CU 1, and the IAB2-DU' maintains the F1 connection to the target IAB donor CU 2. However, a quantity of logical DUs included in an IAB node is not limited in this application.

It should be noted that, in this embodiment of this application, when the source IAB donor includes an IAB donor DU and an IAB donor CU, an operation of the source IAB donor, for example, communication with the first IAB node or the target IAB donor, may be specifically understood as an operation performed by the CU of the source IAB donor. When the source IAB donor includes an IAB donor DU, an IAB donor CU-CP, and an IAB donor CU-UP, an operation or action of the source IAB donor, for example, communication with the first IAB node/target IAB donor, may be specifically understood as an operation or action performed by the source IAB donor CU-CP. When the target IAB donor includes an IAB donor DU and an IAB donor CU, an operation of the target IAB donor, for example, communication with the first IAB node/source IAB donor, may be specifically understood as an operation performed by the CU of the target IAB donor. When the target IAB donor includes an IAB donor DU, an IAB donor CU-CP, and an IAB donor CU-UP, an operation of the target IAB donor, for example, communication with the first IAB node/source IAB donor, may be specifically understood as an operation performed by the CU-CP of the target IAB donor.

S804: The first IAB node receives first indication information, where the first indication information indicates the first IAB node to establish the F1 connection to the target IAB donor.

The first indication information may be an IP address of the target IAB donor. In this case, the IP address of the target IAB donor is used as implicit indication information. To be specific, after the first IAB node receives a message that is sent by the source IAB donor and that includes the IP address of the target IAB donor, establishment of the F1 connection to the target IAB donor may be triggered. Alternatively, the first indication information may be the IP address of the target IAB donor, and explicit indication information indicating the DU part of the first IAB node to initiate establishment of the F1 connection to the target IAB donor. The IP address of the target IAB donor specifically includes at least one of the following: an IP address (which may be specifically an IP address of the target IAB donor CU or an IP address of the target IAB donor CU-CP) used by a control plane of the target IAB donor, an IP address of a security gateway (Security Gateway) of the target IAB donor, and/or an IP address (which may be specifically an IP address of the target IAB donor CU-UP) used by a user plane of the target IAB donor. The source IAB donor sends the first indication information to the first IAB node, where the first indication information indicates the DU part of the first IAB node to establish the F1 connection to the target IAB donor.

In a possible implementation, the first IAB node receives the first indication information from the source IAB donor. After determining in step S802 that the DU part of the first IAB node needs to perform the connection update to establish the F1 connection to the target IAB donor, the source IAB donor determines the first indication information, and then sends the first indication information to the first IAB node. In a possible example, the source IAB donor sends a first request message to the target IAB donor, where the first request message is used to request the IP address of the target IAB donor. The source IAB donor receives a first response message from the target IAB donor, where the first response message includes the IP address of the target IAB donor.

In this embodiment of this application, in another possible implementation, the first IAB node receives the first indication information from an operations, administration, and maintenance OAM. Specifically, the first IAB node reports an identifier of the target cell of the first IAB node to the operations, administration, and maintenance OAM. The OAM determines the target IAB donor based on the identifier of the target cell, and then provides the first indication information for the first IAB node. The first IAB node triggers, based on the IP address of the target IAB donor received from the OAM, the process of establishing the F1 connection to the target IAB donor. For how the first IAB node obtains the identifier of the target cell of the first IAB node, in a possible example, when determining, based on the measurement report reported by the first IAB node, to perform switching for the first IAB node, the source IAB donor may first provide first configuration information of the target cell for the first IAB node, including the identifier of the target cell of the first IAB node. In this case, the target cell is a cell that is managed by the target IAB donor and that needs to be accessed after the MT part of the first IAB node performs switching. Alternatively, in another possible example, when the first IAB node performs link recovery, the MT part of the first IAB node performs RRC re-establishment, selects the target cell for access, and obtains the identifier of the target cell in a process of reading system information of the target cell. In this case, the target cell is a cell that is managed by the target IAB donor and that is selected and accessed by the MT part of the first IAB node when the MT part of the first IAB node performs an RRC re-establishment process.

In another possible implementation, the first IAB node receives the first indication information from the target IAB donor. When the first IAB node performs a link-recovery-based connection update, the target IAB donor (which may be specifically the CU or the CU-CP of the target IAB donor) may learn that the first IAB node performing re-establishment is an IAB node (not common UE) based on context information of the first IAB node that is obtained from the source IAB donor after the MT part of the first IAB node successfully performs RRC re-establishment. The target IAB donor further determines that the F1 connection needs to be established with the DU part of the first IAB node, and may send the first indication information (which may be specifically sent to the MT part of the first IAB node) to the first IAB node.

S806: The DU part of the first IAB node establishes the F1 connection to the target IAB donor based on the first indication information.

In this embodiment of this application, the DU part of the first IAB node triggers establishment of the F1 connection to the target IAB donor based on the first indication information from the source IAB donor, from the operations, administration, and maintenance OAM, or from the target IAB donor.

According to the foregoing method, when a connection update needs to be performed for the DU part of the first IAB node between CUs of different IAB donors (for example, the F1 connection of the DU of the first IAB node is switched or re-established between the CUs of the different IAB donors), establishment of F1 connections between the first IAB node and the CUs of the target IAB donors can be triggered in time, thereby reducing a delay.

In a possible implementation, the IAB node connection update method provided in this embodiment of this application further includes steps shown in FIG. 8(*b*), and the steps are specifically as follows:

S808: A first IAB node receives second indication information.

The second indication information indicates that a cell served by a DU part of the first IAB node may be changed to a cell managed by a target IAB donor.

In this embodiment of this application, in a possible implementation, the first IAB node receives the second indication information from a source IAB donor. In an example, when an MT part of the first IAB node is still connected to the source IAB donor, the source IAB donor (which may be specifically a CU of the source IAB donor) sends, to the MT part of the first IAB node, the second indication information carried in a radio resource control RRC message. Optionally, after receiving the second indication information from the source IAB donor, the MT part of the first IAB node may indicate, to the DU part of the first IAB node through an internal interface, that served cell switching can be performed, or directly forward the second indication information to the DU part of the first IAB node through the internal interface. Alternatively, in another example, when the CU of the source IAB donor determines to send the second indication information to the first IAB node, if an F1 connection is maintained between the CU of the source IAB donor and the DU part of the first IAB node, the CU of the source IAB donor may directly send the second indication information carried in an F1 application protocol F1AP message to the DU part of the first IAB node. Correspondingly, the DU part of the first IAB node receives the second indication information by using the F1 application protocol F1AP message from the CU of the source IAB donor.

In this embodiment of this application, in another possible implementation, when the MT part of the first IAB node has been connected to the target IAB donor, the first IAB node may receive the second indication information from the target IAB donor. In an example, the CU of the source IAB donor may first send seventh indication information to a CU of the target IAB donor, so that the CU of the target IAB donor can learn that the second indication information indicating served cell switching can be sent to the first IAB node. Then, the CU of the target IAB donor sends an RRC message to the MT part of the first IAB node, where the RRC message carries the second indication information. Optionally, when sending the seventh indication information, the CU of the source IAB donor may further carry an identifier of the first IAB node. Specifically, the identifier may be, for example, an identifier allocated by the first IAB node on an Xn interface between the CU of the source IAB donor and the CU of the target IAB donor, for example, an NG-RAN node UE XnAP ID allocated by the CU of the source IAB donor to the MT part of the first IAB node, and/or an NG-RAN node UE XnAP ID allocated by the CU of the target IAB donor to the MT part of the first IAB node. In addition, optionally, the seventh indication information and the second indication information may be same indication information, or may be different indication information. After receiving the seventh indication information from the CU of the source IAB donor, the CU of the target IAB donor sends the second indication information to the MT part of the first IAB node by using the radio resource control RRC message. Optionally, the MT part of the first IAB node receives the second indication information carried in the radio resource control RRC message from the target IAB donor, and may indicate, to the DU part of the first IAB node through the internal interface, that the served cell switching can be performed, or directly forward the second indication information to the DU part of the first IAB node through the internal interface. Alternatively, in another example, there is an F1 connection between the CU of the target IAB donor and the DU of the first IAB node, and the F1 connection may be used to carry an F1 application protocol F1AP message. When receiving the seventh indication information from the source IAB donor and determining that the second indication information can be sent to the first IAB node, the target IAB donor sends the F1AP message to the first IAB node, where the F1 application protocol F1AP message may include the second indication information. Correspondingly, the DU part of the first IAB node receives the second indication information carried in the F1 application protocol F1AP message from the target IAB donor.

In a possible implementation, after sending configuration information to all descendent nodes of the first IAB node, the CU of the source IAB donor may determine that the DU of the first IAB node may hand over the cell served by the DU of the first IAB node to the cell managed by the target IAB node, and further determine that the second indication information may be sent to the first IAB node. Then, the source IAB donor may directly send the second indication information to the first IAB node. Alternatively, the source IAB donor may send the seventh indication information to the target IAB donor, and then the target IAB donor sends the second indication information to the first IAB node. The configuration information is RRC configuration information for accessing the cell managed by the target IAB donor by the descendent node (the descendent node may be specifically descendent UE or a descendent IAB node) of the first IAB node after the cell served by the DU part of the first IAB node is changed to the cell managed by the target IAB donor. In an example, in this implementation, the descendent node of the first IAB node may include only a child node of the first IAB node (the child node may be UE or a child IAB node that accesses the cell served by DU of the first IAB node).

S810: The first IAB node changes the cell served by the DU part of the first IAB node from a cell managed by the source IAB donor to the cell managed by the target IAB donor.

In this embodiment of this application, in a possible implementation, the first IAB node receives the second indication information sent by the source IAB donor or the target IAB donor in S808. The first IAB node changes, based on the second indication information, the cell served by the DU part of the first IAB node from the cell managed by the source IAB donor to the cell managed by the target IAB donor.

In this embodiment of this application, in another possible implementation, when the first IAB node determines that the descendent node of the first IAB node receives the configuration information, the first IAB node changes the cell served by the DU part of the first IAB node from the cell managed by the source IAB donor to the cell managed by the target IAB donor. The configuration information is the RRC configuration information for accessing the cell managed by the target IAB donor by the descendent node of the first IAB node after the cell served by the DU part of the first IAB node is changed to the cell managed by the target IAB donor. In an example, in this implementation, the descendent node of the first IAB node may include only the child node of the first IAB node (the child node may be the UE or the child IAB node that accesses the cell served by the DU of the first IAB node). For example, after the first IAB node determines that all child nodes of the first IAB node receive the configuration information, the first IAB node changes the cell served by the DU part of the first IAB node from the cell managed by the source IAB donor to the cell managed by the target IAB donor.

In this embodiment of this application, in still another possible implementation, when the first IAB node receives the second indication information, and determines that the descendent node of the first IAB node receives the configuration information, the first IAB node changes the cell served by the DU part of the first IAB node from the cell managed by the source IAB donor to the cell managed by the target IAB donor. The configuration information is the RRC configuration information for accessing the cell managed by the target IAB donor by the descendent node of the first IAB node after the cell served by the DU part of the first IAB node is changed to the cell managed by the target IAB donor. In a possible example, in this implementation, the descendent node of the first IAB node may include only the child node of the first IAB node (the child node may be the UE or the child IAB node that accesses the cell served by the DU the first IAB node). For example, after the first IAB node receives the second indication information, and determines all the child nodes (including the UE and the child IAB node that access the cell served by the DU part of the first IAB node) of the first IAB node receive the configuration information, the first IAB node changes the cell served by the DU part of the first IAB node from the cell managed by the source IAB donor to the cell managed by the target IAB donor.

It should be noted that a specific method for determining that the descendent node (a first descendent node is used as an example) of the first IAB node receives the configuration information is as follows:

The first descendent node of the first IAB node is specifically a child node of the first IAB node, and the DU part of the first IAB node receives the F1 application protocol FLAP message from the source IAB donor, where the FLAP message carries an RRC message container, and an RRC message of the first descendent node of the first IAB node is encapsulated in the RRC message container. After determining that the RRC message includes the configuration information of the descendent node, and successfully sending an RRC message to the first descendent node, the first IAB node determines that the first descendent node receives the configuration information. The configuration information is the RRC configuration information for accessing the cell managed by the target IAB donor by the first descendent node after the cell served by the DU part of the first IAB node is changed to the cell managed by the target IAB donor. The cell managed by the target IAB donor is a cell served by the DU part of the first IAB node after the cell served by the DU part of the first IAB node is changed to the cell managed by the target IAB donor.

It should be noted that, after receiving the F1 application protocol F1AP message from the source IAB donor, the DU part of the first IAB node further needs to determine that the RRC message encapsulated in the RRC message container carried in the F1 application protocol F1AP message carries the configuration information of the descendent node, where the configuration information may be specifically a handover command of the descendent node, and the handover command may be understood as a ReconfigurationwithSync IE in the RRC message. Based on configuration content provided in the handover command, the descendent node of the first IAB node accesses the cell managed by the target IAB donor after the cell served by the DU part of the first IAB node is changed to the cell managed by the target IAB donor. Optionally, in this embodiment of this application, methods in which the first IAB node determines that the RRC message encapsulated in the RRC message container carried in the F1 application protocol F1AP message carries the configuration information of the descendent node are as follows:

Method 1: When the CU of the source IAB donor sends the RRC message carrying the configuration information of the descendent node of the first IAB node to the DU of the first IAB node, the CU of the source IAB donor encapsulates the RRC message in the F1AP message which may carry indication information for stopping scheduling on data transmission on the descendent node of the first IAB node (for example, the FLAP message carries a Transmission Action Indicator IE, and a value of this IE is stop). When the first IAB node receives the F1AP message that includes the RRC message of the descendent node of the first IAB node, and the F1AP message includes the indication information for stopping performing data transmission scheduling on the descendent node of the first IAB node, the first IAB node may determine that the RRC message carried in the F1AP message includes the configuration information of the descendent node. It is equivalent to implicitly indicating that the RRC message carried in the F1AP message includes the configuration information for the descendent node by carrying the indication information for stopping scheduling on data transmission on the descendent node of the first IAB node. Based on the configuration information, the descendent node may access the cell managed by the target IAB donor served by the DU of the first IAB node.

Method 2: When the CU of the source IAB donor sends the RRC message carrying configuration information of the descendent node of the first IAB node to the first IAB node, the F1AP message including the RRC message may directly include explicit indication information, to indicate that the RRC message included in the F1AP message includes the configuration information of the descendent node of the first IAB node.

Method 3: The CU of the source IAB donor indicates a data packet sequence number to the first IAB node, where the F1AP message encapsulated in a data packet corresponding to the data packet sequence number includes the configuration information of the descendent node, so that the first IAB node identifies the configuration information of the descendent node of the first IAB node. For example, the data packet sequence number may be a sequence number of an SCTP layer. It may be understood that, if a data packet corresponding to a specific sequence number value transmitted on specific SCTP association carries the configuration information, the CU of the source IAB donor may indicate a specific SCTP association identifier and/or a specific SCTP stream ID to the first IAB node in addition to indicating the data packet sequence number. The SCTP association identifier may be identified by any one or more items in IP 5-tuple information (source IP address, destination IP address, source port number, destination port number, protocol type).

Method 4: After the first IAB node receives the FLAP message including the RRC message of the descendent node of the first IAB node, the DU part of the first IAB node does not care whether the RRC message included in the F1AP message carries the configuration information of the descendent node, and only needs to determine that the CU of the source IAB donor starts to send the configuration information to the descendent node of the first IAB node. After receiving the F1AP message that includes the RRC message of the descendent node, the first IAB node considers that the RRC message in the F1AP message includes the configuration information of the descendent node. In this method, optionally, the CU of the source IAB donor or the CU of the target IAB donor may send notification information to the first IAB node. The notification information may indicate that the CU of the source IAB donor starts to send the configuration information to the descendent node of the first IAB node, and the configuration information may indicate the first IAB node to start monitoring and collecting statistics on RRC message receiving and sending statuses of the descendent node of the first IAB node. For example, when determining to send the configuration information of the descendent node of the first IAB node, the CU of the source IAB donor may send the notification information to the first IAB node, or send the notification information to the first IAB node by using the target IAB donor.

In a possible implementation, the IAB node connection update method provided in this embodiment of this application further includes steps shown in FIG. 8(*c*), and the steps are specifically as follows:

S812: A descendent node of a first IAB node receives configuration information from a DU part of the first IAB node.

In this embodiment of this application, the descendent node of the first IAB node is descendent UE of the first IAB node and/or a descendent IAB node of the first IAB node, and may be specifically a child node (for example, UE and/or a child IAB node that access/accesses a cell served by the DU part of the first IAB node) of the first IAB node.

In this embodiment of this application, the descendent node of the first IAB node receives an RRC message sent by the DU part of the first IAB node in S810. The RRC message includes the configuration information. The configuration information is RRC configuration information for accessing a cell managed by a target IAB donor by the descendent node after the cell served by the DU part of the first IAB node is changed to the cell managed by the target IAB donor.

S814: The descendent node of the first IAB node makes the configuration information effective.

In this embodiment of this application, the descendent node of the first IAB node may be specifically the child node (for example, the UE and/or the child IAB node that access/accesses the cell served by the DU part of the first IAB node) of the first IAB node.

In this embodiment of this application, in a possible implementation, when the first IAB node determines that an RRC message that is of a first descendent node of the first IAB node and that is carried in an F1 application protocol F1AP message received by the first IAB node includes configuration information of the first descendent node, the first IAB node buffers the RRC message, and then sends the buffered RRC message to the first descendent node after receiving second indication information. In this way, it can be ensured that descendent nodes of the first IAB node receive configuration information within close time, and perform a connection update based on the configuration information. A manner in which the first IAB node determines that the RRC message that is of the first descendent node of the first IAB node and that is carried in the F1 application protocol F1AP message received by the first IAB node includes the configuration information of the first descendent node may be understood with reference to the description in step S810. The configuration information of the first descendent node is RRC configuration information for accessing the cell managed by the target IAB donor by the first descendent node after the cell served by the DU part of the first IAB node is changed to the cell managed by the target IAB donor.

In this embodiment of this application, in another possible implementation, the first IAB node does not need to buffer an RRC message of the descendent node of the first IAB node, where the RRC message includes the configuration information of the descendent node of the first IAB node. However, after receiving the configuration information of the descendent node of the first IAB node, the descendent node of the first IAB node may not make the configuration information effective first. After the first IAB node completes sending RRC messages including configuration information to all descendent nodes of the first IAB node, the DU part of the first IAB node may broadcast fourth indication information to all the descendent nodes, where the fourth indication information indicates descendent UEs of the first IAB node and/or descendent IAB nodes to make the configuration information effective. In this manner, when obtaining the RRC message including the configuration information of the descendent node, the descendent node of the first IAB node obtains fifth indication information, where the fifth indication information is used by the descendent node to indicate to delay to make the configuration information effective in the RRC message. In a possible example, the fifth indication information may be carried by a source IAB donor in the RRC message that is generated by the source IAB donor and that is of the descendent node of the first IAB node, or may be carried by the first IAB node in a MAC layer protocol data unit PDU (for example, in a MAC CE) encapsulated with the RRC message. The RRC message includes RRC configuration information for accessing the cell managed by the target IAB donor by the descendent node after the cell served by the DU part of the first IAB node is changed to the cell managed by the target IAB donor.

In this embodiment of this application, in still another possible implementation, the first IAB node does not need to buffer the RRC message including the configuration information of the descendent node. However, after receiving the configuration information, the descendent node of the first IAB node may not make the configuration information effective first, but determine, based on duration information indicated by the first IAB node, a moment at which the configuration information is effective. It may be understood that the duration information may be carried in the RRC message including the configuration information of the descendent node of the first IAB node, may be carried in the MAC PDU encapsulated with the RRC message, or may be carried in a backhaul adaptation protocol (Backhaul Adaptation Protocol, BAP) layer control PDU for being sent to the descendent node. The descendent UE of the first IAB node and/or the descendent IAB node may start a timer after receiving the RRC message including the configuration information based on the received duration information, make the configuration information effective in the RRC message after the timer expires, and access the cell (namely, the cell served by the DU part of the first IAB node after the cell served by the DU part of the first IAB node is changed to the cell managed by the target IAB donor) managed by the target IAB donor based on the configuration information.

In another possible implementation, after receiving the configuration information, the descendent node of the first IAB node may not make the configuration information effective first, but perform cell search. When finding a target cell, the descendent node makes the configuration information effective. The target cell is a cell served by the DU part of the first IAB node after the cell served by the DU part of the first IAB node is changed to the cell managed by the target IAB donor, and is identified by a target cell identifier in the configuration information.

It should be noted that the descendent node of the first IAB node makes the configuration information effective may include that the descendent node of the first IAB node accesses, based on the configuration information, the target cell specified in the configuration information, to establish a connection to the target IAB donor.

It should be noted that S812 and S814 may be performed before S810.

If the first IAB node has a plurality of descendent nodes, these descendent nodes successively receive their respective configuration information. If a descendent node (for example, a descendent node X) of the first IAB node that receives configuration information first immediately performs the connection update based on a configuration in the configuration information, the descendent node X cannot find the target cell if the DU part of the first IAB node has not handed over the cell served by the DU part of the first IAB node to the cell managed by the target IAB donor. In this case, the descendent node X may perform RRC re-establishment. Therefore, in this embodiment of this application, it is considered that all descendent nodes (namely, all subnodes that access the cell served by the DU part of the first IAB node) at a same level synchronously make configuration information effective as much as possible or make configuration information effective within a short time range, to reduce a service interruption delay and improve user experience.

Embodiment 2

In this embodiment of this application, in a topology update process of an IAB node, in addition to considering topology updates caused by scenarios such as migration of the IAB node or connection to a new IAB donor after RRC re-establishment is performed, dual connectivity of the IAB node is further considered. In a possible implementation, the IAB node may support dual connectivity (it may be considered as NR-DC of the IAB node. Both a master node and a secondary node communicate with the IAB node by using an NR air interface technology) in a donor node, and may further support dual connectivity in an EN-DC scenario. It is considered that some IAB nodes may be located in coverage of two different gNBs. In this case, the IAB node may form NR-DC based on dual connectivity established between the IAB node and the two different gNBs, to provide a plurality of transmission paths for service data or signaling transmission of the IAB node and/or a descendent node, thereby improving flexibility and robustness of service data or signaling transmission.

It may be understood that, even if the IAB node is connected to the two different gNBs, the IAB node still establishes an F1 connection (or a control plane connection of the F1 connection) to only one of the two gNBs, and the gNB that establishes the F1 connection to the IAB node is an IAB donor (IAB donor) of the IAB node. Therefore, in a process in which the IAB node establishes inter-gNB dual connectivity, it is necessary to determine which gNB is the donor node of the IAB node (IAB donor, or donor gNB (donor gNB)).

In a possible implementation, the IAB node is connected to the two gNBs, but a wireless backhaul link is established only on a link corresponding to one cell group (cell group, CG), and an NR Uu interface is established with a corresponding gNB on the other CG, and a BH link is not established.

Figures 9, 10, 11:
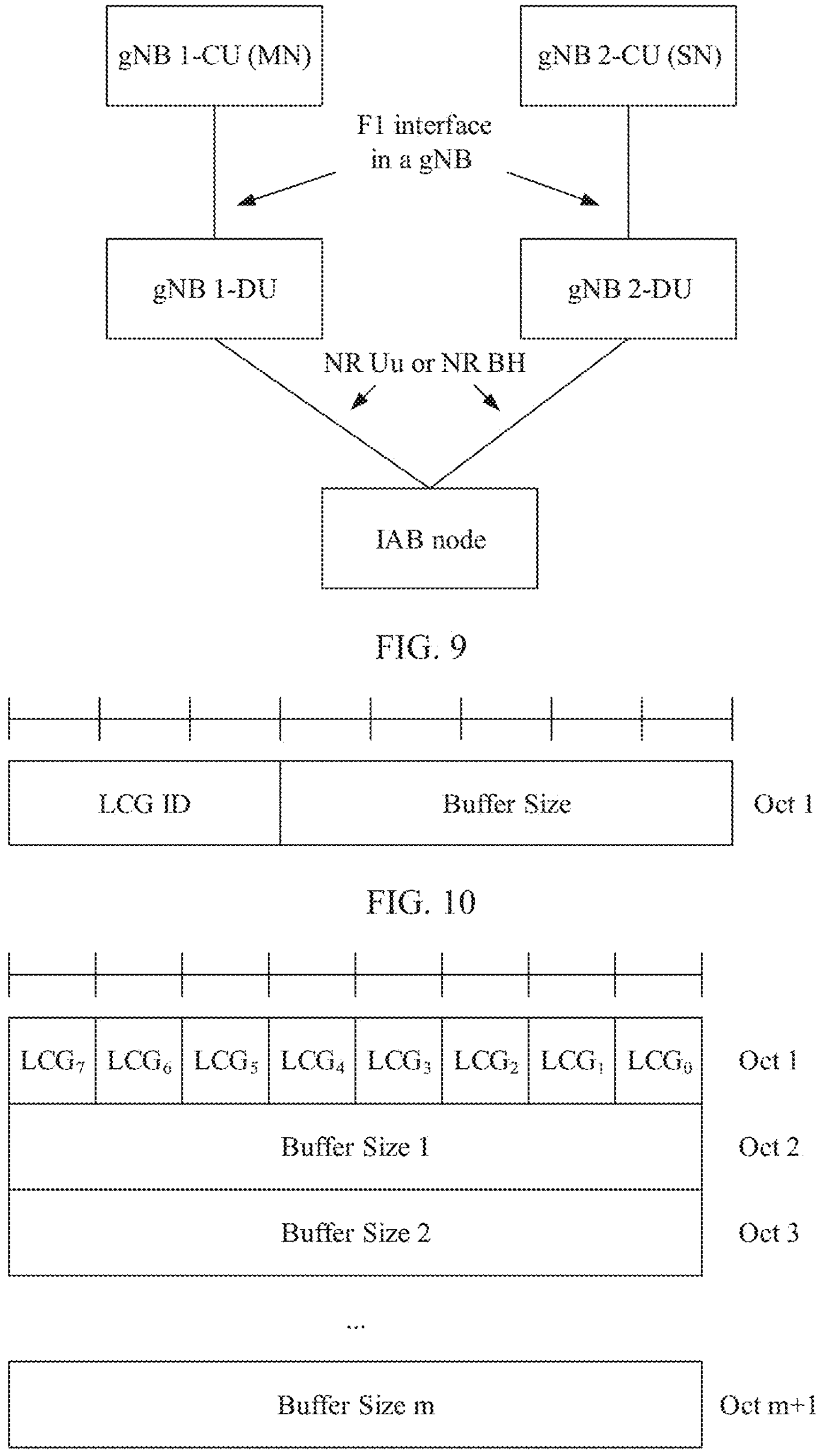
FIG. 9 is a schematic diagram of establishing dual connectivity by an IAB node according to an embodiment of this application.
FIG. 10 is a schematic diagram of a short BSR format or a short truncated BSR format in a possible implementation.
FIG. 11 is a schematic diagram of a long BSR format or a long truncated BSR format in a possible implementation.

As shown in FIG. 9, an IAB node (which may be specifically an MT part of the IAB node) first establishes dual connectivity (which may be referred to as NR-DC) based on an NR access technology with two gNBs (gNB 1 and gNB 2) in a manner in which UE establishes dual connectivity. The gNB 1 is a master node (MN, master node) of the IAB node, and the gNB 2 is a secondary node (SN, secondary node) of the IAB node. It should be noted that, in FIG. 9, the IAB node directly accesses cells served by a DU of the gNB 1 and a DU of the gNB 2. In an actual deployment scenario, if the gNB 1 and/or the gNB 2 support/supports a function of an IAB donor, the IAB node may further access a cell served by another IAB node connected to the gNB 1 and/or the gNB 2.

If both the gNB1 and the gNB2 have the function of the IAB donor, in other words, both the gNB1 and the gNB2 may serve as donor gNB s of the IAB node to provide services for the IAB node, to determine that one of the gNBs serves as the donor gNB of the IAB node, this application provides the following three manners:

Manner 1: The MN of the IAB node determines a gNB serving as the donor gNB of the IAB node.

In a possible implementation, the MN has a capability of the IAB donor, and determines that the MN serves as the donor gNB of the IAB node. In this case, the MN of the IAB node may generate second configuration information for the IAB node, to prepare for setup (setup) of a DU part of the IAB node. The second configuration information may be used to establish SCTP association (SCTP association) between the DU part of the IAB node and the MN, perform security mechanism negotiation (for example, IPsec-based security negotiation), establish an F1 connection, and the like. The second configuration information for the MN to prepare for setup of the DU part of the IAB node may include one or more items of the following content: an IP address (which may be specifically an IP address of a CU of the MN connected to the IAB node or an IP address of a CU-CP of the MN) of the MN, an IP address of the IAB node, configuration information of a wireless backhaul RLC channel (backhaul RLC channel, BH RLC CH) on a link, corresponding to a master cell group (Master cell group, MCG), between the IAB node and a parent node, a BAP layer identifier (BAP address) of the IAB node, an identifier of a default BH RLC CH (default BH RLC CH) on the link, corresponding to the MCG, between the IAB node and the parent node, an uplink default BAP routing identifier (default BAP routing ID) of the IAB node, and a BAP layer identifier (BAP address) of the parent node of the IAB node corresponding to the MCG. The second configuration information may be carried by the MN in an RRC message generated by the MN, and sent to the IAB node.

In another possible implementation, the MN selects the SN as the donor gNB of the IAB node. In this case, the SN needs to generate third configuration information for the IAB node, to prepare for setup (setup) of a DU part of the IAB node. The third configuration information may be used to establish SCTP association (SCTP association) between the DU part of the IAB node and the SN, perform security mechanism negotiation (for example, IPsec-based security negotiation), establish an F1 connection, and the like. The third configuration information may include one or more items of the following content: an IP address (which may be specifically an IP address of a CU of the SN connected to the IAB node or an IP address of a CU-CP of the SN) of the SN, an IP address of the IAB node, configuration information of a BH RLC CH on a link between the IAB node and a parent node corresponding to an SCG (secondary cell group), a BAP layer identifier of the IAB node, an identifier of a default BH RLC CH on the link between the IAB node and the parent node corresponding to the SCG, an uplink default BAP routing identifier (default BAP routing ID) of the IAB node, and a BAP layer identifier of the parent node of the IAB node corresponding to the SCG. In this case, to enable the SN to learn that the SN needs to serve as the donor gNB (donor gNB) of the IAB node and generate the third configuration information for the IAB node, after determining that the SN serves as the donor gNB of the IAB node, the MN needs to notify the SN that the SN needs to serve as the donor gNB of the IAB node. The third configuration information may be carried by the SN in an RRC message generated by the SN, and sent to the IAB node. Alternatively, the SN encapsulates the third configuration information by using an RRC message container of an Xn interface and sends the RRC message container to the MN, and then the MN sends the RRC message container to the IAB node. Specifically, the MN (for example, the gNB1 in FIG. 9) may send a second request message (for example, an S-Node addition request (S-Node addition request) message, or another message. A name of the message is not specifically limited) to the SN (for example, the gNB2 in FIG. 9), where the second request message carries ninth indication information, and the ninth indication information indicates that the MN expects the SN to serve as the donor node of the IAB node. Correspondingly, if the SN can serve as the secondary node of the IAB node and serve as the donor gNB of the IAB node, the SN may return, to the MN, an acknowledgment (for example, S-Node Addition Request Acknowledgment) message carrying information for notifying the MN that the SN confirms that the SN can serve as the donor gNB of the IAB node. For example, the information for notifying the MN that the SN confirms that the SN can serve as the donor gNB of the IAB node may be an explicit acknowledgment indication, or may be an implicit indication by carrying the third configuration information.

To enable the MN and the SN to know each other whether the MN and the SN have a capability of serving as the donor gNB of the IAB node, the MN and the SN may learn, through Xn interface signaling interaction, whether the MN and the SN have the capability, or learn, through an OAM configuration, whether the MN and the SN have the capability.

Manner 2: A network management device (for example, operations, administration, and maintenance OAM) of the IAB node determines a gNB serving as the donor gNB of the IAB node.

The IAB node may report an identifier (which may include only an identifier of a master cell in the MCG, or identifiers of all cells in the MCG) of a cell corresponding to an MCG connected to the IAB node, and an identifier of a cell (which may include only an identifier of a master cell in the SCG or identifiers of all cells in the SCG) corresponding to an SCG to the OAM. Then, the OAM may determine, based on the identifier that is of the cell corresponding to the MCG and that is reported by the IAB node, that the MN serves as the donor gNB of the IAB node, or may determine, based on the identifier that is of the cell corresponding to the SCG and that is reported by the IAB node, that the SN serves as the donor gNB of the IAB node. After determining whether the MN or the SN serves as the donor gNB of the IAB node, the OAM may configure an IP address (which may be specifically an IP address of a CU of the donor gNB or an IP address of a CU-CP) of the selected donor gNB for the IAB node, so that the IAB node initiates an F1 connection to a node corresponding to the IP address.

To enable the donor gNB of the IAB node to learn of a role of the donor gNB of the IAB node, and generate, for the IAB node, second configuration information (generated by the MN) or third configuration information (generated by the SN) for setup of a DU part, in a possible manner, the OAM may further send tenth indication information to the gNB (for example, the gNB1 or the gNB2 in FIG. 9) selected as the donor gNB of the IAB node, to indicate that the gNB needs to serve as the donor gNB of the IAB node. If the OAM of the IAB node is different from an OAM connected to the gNB selected as the donor gNB of the IAB node, the OAM (briefly referred to as an OAM-IAB) of the IAB node needs to first send notification information (which may include an identifier of the donor gNB, for example, the IP address, a gNB ID of the donor gNB, or an identifier of the CU of the donor gNB) to the OAM (briefly referred to as an OAM-donor) connected to the gNB selected as the donor gNB of the IAB node. Then, the OAM-donor sends eleventh indication information to the selected donor gNB, where the eleventh indication information indicates that the gNB needs to serve as the donor gNB of the IAB node. In another possible manner, after determining whether the MN or the SN serves as the donor gNB of the IAB node, the OAM may directly send configuration information to the IAB node, to indicate whether the selected donor gNB is the MN or the SN of the IAB node (or a gNB corresponding to the MCG or a gNB corresponding to the SCG). After learning, based on the configuration information received from the OAM, whether the donor gNB is the MN or the SN, the IAB node may directly report, by using an RRC message, a notification message to the gNB selected as the donor gNB, to notify the gNB that the gNB serves as the donor node of the IAB node. Alternatively, the IAB node may report, to the MN by using an RRC message, whether the node selected as the donor gNB is the MN or the SN. If the donor gNB is the SN, the MN may continue to use a manner in Manner 1 to send a request message carrying indication information to the SN through an Xn interface, to notify the SN that the SN is selected as the donor gNB of the IAB node.

Manner 3: The IAB node selects and determines a gNB serving as the donor gNB of the IAB node.

After establishing dual connectivity between the IAB node (which may be specifically the MT part of the IAB node) and the MN and the SN, the IAB node may obtain an IP address of the MN (which may be specifically an IP address of a CU part of the MN or an IP address of a CU-CP of the MN) and an IP address of the SN (which may be specifically an IP address of a CU part of the SN or an IP address of a CU-CP of the SN) in advance. For example, a specific obtaining manner may be as follows: The IAB node obtains the IP address of the MN and the IP address of the SN from an OAM, or the IAB node obtains the IP address of the MN and the IP address of the SN from the MN/SN, or the IAB node obtains the IP address of the MN from the MN and obtains the IP address of the SN from the SN. The IAB node selects the MN or the SN as the donor gNB of the IAB node, and then may directly report a notification message to a gNB selected as the donor gNB by using an RRC message, where the notification message is used to notify that the gNB serves as the donor node of the IAB node. Alternatively, the IAB node may report, to the MN by using an RRC message, whether a node selected as the donor gNB is the MN or the SN. If the donor gNB is the SN, the MN may continue to use a manner in Manner 1 to send a request message carrying indication information to the SN through an Xn interface, to notify the SN that the SN is selected as the donor gNB of the IAB node.

When a DU part of the IAB node is started up, a default BAP routing ID in second configuration information is used to route uplink data packets (for example, an uplink data packet included in an IPsec negotiation process, some uplink data packets that are of an SCTP chunk, that are sent to a donor CU, and that are included in a four-way handshake process for SCTP association establishment, and a data packet included in an uplink F1AP message such as F1 SETUP REQUEST). These uplink data packets in an initial startup process are mapped to a default BH RLC CH for transmission to a parent node. Therefore, the IAB node needs to learn that a default configuration (the default BAP routing ID, and/or the default BH RLC CH ID) in the second configuration information is configuration information on which link (or referred to as a default wireless backhaul link of the IAB node, default BH link). Alternatively, the IAB node needs to determine which CG is a CG served by the donor gNB (the CG served by the donor gNB corresponds to a default BH link of the IAB node). Then, the IAB node uses the default link to perform a subsequent step for setup of the DU. To resolve this problem, there are also the following two different implementations in this embodiment of this application.

In a possible implementation, in the foregoing description of how to determine one of the two gNBs dual-connected to the IAB node as the donor gNB of the IAB node, if the IAB node already knows whether the selected donor gNB is the MN or the SN (for example, in Manner 2, the OAM notifies the IAB node, or in Manner 3, the IAB node selects the donor gNB), the IAB node may determine the link corresponding to the CG served by the donor gNB, namely, a default (default) wireless backhaul link of the IAB node. Configuration information such as the default BAP routing ID and the default BH RLC CH ID that is obtained by the IAB node all correspond to the default wireless backhaul link. For example, if the MN is the donor gNB of the IAB node, a link between the IAB node and a parent node of the IAB node corresponding to an MCG is a default wireless backhaul link. If the SN is the donor gNB of the IAB node, a link between the IAB node and a parent node of the IAB node corresponding to an SCG is a default wireless backhaul link.

In the other possible implementation, when receiving configuration information (namely, third configuration information or the second configuration information, including the default BAP routing ID and the default BH RLC CH ID) for setup of the DU part of the IAB node, the IAB node may first determine whether the received configuration information is generated by the SN (in other words, the configuration information is the third configuration information) or by the MN (in other words, the configuration information is the second configuration information). If the IAB node determines that the received configuration information is generated by the SN, the IAB node considers that a link between the IAB node and a parent node corresponding to an SCG is a default BH link. If the IAB node determines that the received configuration information is generated by the MN, the IAB node considers that a link between the IAB node and a parent node corresponding to an MCG is a default BH link. Specifically, the IAB node may determine whether the configuration information is generated by the SN or by the MN by using the following possible methods:

Method 1: If only one of two CGs of the IAB node needs to establish a BH link, and the other CG directly communicates with a corresponding gNB through an NR Uu interface, the IAB node may use an RRC message received by the IAB node to determine that configuration information corresponding to which CG includes a configuration (for example, related configuration information of a BH RLC CH that needs to be added or modified) related to the BH RLC CH. Therefore, the IAB node determines that a gNB corresponding to the CG is the donor gNB, and that a link between the IAB node and a parent node corresponding to the CG is a link served by the donor gNB, and may be considered as a default BH link of the IAB node.

Method 2: The IAB node may determine, based on the configuration information (including the default BAP routing ID and the default BH RLC CH ID) that is for setup of the DU part of the IAB node and that is received by the IAB node, which gNB is the donor gNB and a link corresponding to which CG is a default BH link. For example, if an RRC message received by the IAB node over an SRB3 (signaling radio bearer) includes the configuration information for setup of the DU part of the IAB node, the IAB node determines that the SN is the donor gNB of the IAB node, and the link between the IAB node and the parent node of the IAB node corresponding to the SCG is the default BH link of the IAB node. Alternatively, if an RRC message (namely, an RRC message generated by the MN, and the RRC message may be specifically an RRC reconfiguration message) received by the IAB node over an SRB1 or an SRB2 includes the configuration information for setup of the DU part of the IAB node, and the configuration information is encapsulated in an RRC message container (RRC container, which may be specifically included in, for example, an MRDC-SecondaryCellGroupConfig IE) included in the RRC message generated by the MN, the IAB node determines that the SN is the donor gNB of the IAB node, and the link between the IAB node and the parent node of the IAB node corresponding to the SCG is the default BH link of the IAB node. Alternatively, if neither of the foregoing two cases is satisfied, that is, if an RRC message (namely, an RRC message generated by the MN, which may be specifically an RRC reconfiguration message) received by the IAB node over an SRB1 or an SRB2 includes the configuration information for setup of the DU part of the IAB node, and the configuration information is directly included in the RRC message generated by the MN instead of being encapsulated in an RRC message container, the IAB node determines that the MN is the donor gNB of the IAB node, and the link between the IAB node and the parent node of the IAB node corresponding to the MCG is the default BH link of the IAB node.

According to the method in this embodiment of this application, when the IAB node establishes dual connectivity to a plurality of donor nodes, an appropriate gNB may be flexibly determined as the donor node of the IAB node, and it is ensured that an F1 connection is established between the DU part of the IAB node and the selected donor node. In this way, services can be provided for descendent nodes in a dual connectivity scenario of the IAB node. This can ensure normal operation of the IAB node, and can improve flexibility and robustness of service data or signaling transmission.

Embodiment 3

In this embodiment of this application, in an IAB network topology update scenario, for example, in a scenario in which an IAB node performs intra-donor migration or inter-donor migration, and migrates from a source parent node to a target parent node, if the IAB node is connected to different IAB donor DUs before and after the migration, the IAB node needs to obtain a new IP address, and uses the new IP address to perform a TNL (Transport network layer (Transport network layer)) migration process. In this application, the scenario in which the IAB node performs intra-donor migration or inter-donor migration is applicable to a scenario in which the IAB node performs intra-donor migration or inter-donor migration based on configuration information of the IAB donor in a switching manner, and is further applicable to a scenario in which intra-donor migration or inter-donor migration is implemented by the IAB node (which is specifically an MT part of the IAB node) in a process of performing RRC reestablishment because the IAB node is reestablished to the target parent node.

In an intra-donor migration process, the source parent node and the target parent node of the IAB node are respectively connected to two different IAB donor DUs (which may be respectively denoted as a source IAB donor DU and a target IAB donor DU) managed by a same IAB donor. In this case, the IAB node needs to obtain an IP address related to the target IAB donor DU, and the IAB node executes a TNL migration process. To be specific, based on the IP address, the IAB node negotiates a new IPsce security protection related parameter with an IAB donor CU, may establish new transport layer association (TNL association, or referred to as SCTP association) between the IAB node and the IAB donor CU, and then migrate an F1 connection between the IAB node and the IAB donor CU to a target transmission path (to be specific, some or all of user plane services of an F1 interface and/or some or all of control plane services of the F1 interface are transmitted through the target transmission path). The target transmission path is a transmission path between the IAB node and the IAB donor CU through the target parent node and the target IAB donor DU. In the following, for ease of description, in the intra-donor migration process, because the IAB donor CU connected to the IAB node remains unchanged, the IAB donor CU may also be referred to as a source IAB donor CU.

In an inter-donor migration process, the source parent node of the IAB node is connected to a source IAB donor DU managed by a source IAB donor, and the target parent node is connected to a target IAB donor DU managed by a target IAB donor. In this case, the IAB node also needs to obtain an IP address associated with the target IAB donor DU. If the IAB node still maintains an F1 connection to the source IAB donor after the migration, the IAB node executes a TNL migration process. To be specific, based on the IP address, the IAB node negotiates a new IPsce security protection related parameter with a source IAB donor CU, may establish new transport layer association (TNL association, or referred to as SCTP association) between the IAB node and the source IAB donor CU, and then migrate the F1 connection between the IAB node and the source IAB donor CU to a target transmission path (to be specific, some or all of user plane services of an F1 interface and/or some or all of control plane services of the F1 interface are transmitted through the target transmission path). The target transmission path is a transmission path between the IAB node and the source IAB donor CU through the target parent node and the target IAB donor DU. If the IAB node needs to establish the F1 connection between the IAB node and the target IAB donor after the migration, the IAB node executes the TNL migration process. To be specific, based on the IP address, the IAB node negotiates a new IPsce security protection related parameter with a target IAB donor CU, may establish new transport layer association (TNL association, or referred to as SCTP association) between the IAB node and the target IAB donor CU, and then migrate an F1 connection between the IAB node and the target IAB donor CU to a target transmission path (in other words, some or all of user plane services of the F1 interface and/or some or all of control plane services of the F1 interface are transmitted through the target transmission path). The target transmission path is a transmission path between the IAB node and the target IAB donor CU through the target parent node and the target IAB donor DU.

Regardless of which scenario of migration process is performed by the IAB node, if the TNL migration process is involved, the TNL migration process also needs to be performed by a descendent IAB node of the IAB node. For example, in FIG. 7, if the IAB node 2 performs inter-donor migration and needs to perform a TNL migration process, the child node IAB node 3 of the IAB node 2 also needs to perform a similar TNL migration process. Each node needs to obtain necessary configuration information related to TNL migration by using an RRC message before performing TNL migration, including a new IP address to be used on a target path, and further needs to obtain an uplink default routing identifier (default BAP routing ID) and a default BH RLC CH (default BH RLC CH, which is identified by a default BH RLC CH ID) that correspond to the target transmission path, to transmit an uplink message that the IAB node needs to send to the IAB donor CU in the TNL migration process. The necessary configuration information related to TNL migration is sent to each IAB node by the source IAB donor CU connected to an MT part of the IAB node by using the RRC message. It may be understood that, the IAB node that performs migration may have a plurality of levels of descendent nodes such as a child node and a grandson node. If TNL migration is performed in sequence from top to bottom, in other words, each descendent node starts to perform TNL migration only after TNL migration of an upper-level node is completed (including a process of obtaining the necessary configuration information related to the TNL migration, and executing TNL migration based on the configuration information), an entire IAB node migration process lasts for a long time, which greatly affects a service interruption delay of UE. To reduce impact on service interruption of the UE in the IAB node migration process, two solutions are provided in this embodiment of this application.

It is assumed that both a first IAB node and a second IAB node are IAB nodes that need to perform TNL migration because an IAB network topology is updated, and the first IAB node is a parent node of the second IAB node. For example, the first IAB node is the IAB node 2 in FIG. 7, and the second IAB node is the IAB node 3 in FIG. 7.

Solution 1: The source IAB donor CU sends, to the first IAB node in advance, an RRC message (denoted as a first RRC message) that includes configuration information related to TNL migration performed by the second IAB node. The first IAB node first buffers the first RRC message of the second IAB node, and sends the first RRC message to the second IAB node after determining that a condition 1 is met.

In an implementation of the solution 1, this manner may specifically include the following steps.

Step 1: The source IAB donor CU sends, to the first IAB node, the RRC message (denoted as the first RRC message) that includes the configuration information related to TNL migration performed by the second IAB node. The IAB donor CU encapsulates the first RRC message in an F1AP message of the first IAB node, and sends the F1AP message including twelfth indication information, where the twelfth indication information indicates the first IAB node to buffer the first RRC message in the F1AP message.

Step 2: The first IAB node obtains the configuration information, and determines that the condition 1 is effective.

The configuration information includes route and bearer mapping-related configurations of the first IAB node on a target path of the first IAB node, where the routing and bearer mapping-related configurations may be used to transmit a data packet related to TNL migration of the second IAB node. The route-related configuration obtained by the first IAB node includes a route mapping table entry related to a default BAP routing ID of the second IAB node on the target path, to be specific, includes the default BAP routing ID of the second IAB node on the target path of the second IAB node, and an identifier of a next-hop node of the first IAB node corresponding to the default BAP routing ID. The bearer mapping-related configuration includes an entry related to a default BH RLC CH of the second IAB node on the target path, to be specific, includes an identifier of a BH RLC CH on an egress link at the corresponding first IAB node when a BH RLC CH on an ingress link is the default BH RLC CH of the second IAB node on the target path. The identifier of the BH RLC CH on the egress link is determined by the identifier of the next-hop node of the first IAB node and a BH RLC CH ID between the first IAB node and the next-hop node.

Optionally, in this step, the configuration information obtained by the first IAB node may carry thirteenth indication information indicating that the first IAB node may send the first RRC message buffered by the first IAB node to the second IAB node.

Specifically, the first IAB node may obtain the configuration information in step 2 from the source IAB donor CU by using the RRC message or the F1AP message, or the first IAB node may obtain the configuration information in step 2 from the IAB donor CU to which the first IAB node is connected after TNL migration by using the F1AP message after performing TNL migration.

Specifically, after obtaining the configuration information in step 2, the first IAB node may determine that the condition 1 is effective, and the first IAB node may send the first RRC message to the second IAB node. In a possible example, the first IAB node may determine, based on the thirteenth indication information in the configuration information obtained in step 2, that the first IAB node can send the first RRC message buffered by the first IAB node to the second IAB node. In this case, the condition 1 is that the first IAB node receives the thirteenth indication information. In another possible example, as long as the configuration information obtained in step 2 includes the route and bearer mapping-related configurations of the first IAB node on the target path, in other words, it is considered that these route and bearer mapping-related configurations may be used to transmit the data packet related to the TNL migration of the second IAB node, the first IAB node further determines that the first IAB node may send the first RRC message buffered by the first IAB node to the second IAB node. In this case, the condition 1 is that the first IAB node receives the route and bearer mapping-related configurations on the target path of the first IAB node, or the first IAB node receives the route and bearer mapping-related configurations that may be used to transmit the data packet related to TNL migration of the second IAB node on the target path of the first IAB node.

Step 3: The first IAB node sends the first RRC message to the second IAB node.

Step 4: The second IAB node performs a TNL migration process based on the first RRC message.

Solution 2: The source IAB donor CU sends, to the second IAB node in advance, an RRC message (denoted as a first RRC message) that includes configuration information related to TNL migration performed by the second IAB node, where the first RRC message includes fourteenth indication information indicating that the second IAB node makes the first RRC message effective only after a condition 2 is met. The second IAB node performs a TNL migration process after making the first RRC message effective.

In an implementation of the solution 2, this manner may specifically include the following steps.

Step 1: The source IAB donor CU sends, to the second IAB node, the RRC message (denoted as the first RRC message) that includes the configuration information related to TNL migration performed by the second IAB node. The IAB donor CU encapsulates the first RRC message in an F1AP message of the first IAB node. After receiving the F1AP message, the first IAB node sends the first RRC message included in the F1AP message to the second IAB node.

Optionally, the first RRC message includes the fourteenth indication information indicating the second IAB node not to make the first RRC message effective first, or indicating the second IAB node to make the first RRC message effective only after the condition 2 is met.

Step 2: The first IAB node obtains the configuration information, and determines that a condition 1 is effective.

The configuration information includes route and bearer mapping-related configurations of the first IAB node on a target path of the first IAB node, where the routing and bearer mapping-related configurations may be used to transmit a data packet related to TNL migration of the second IAB node. The route-related configuration obtained by the first IAB node includes a route mapping table entry related to a default BAP routing ID of the second IAB node on the target path, to be specific, includes the default BAP routing ID of the second IAB node on the target path of the second IAB node, and an identifier of a next-hop node of the first IAB node corresponding to the default BAP routing ID. The bearer mapping-related configuration includes an entry related to a default BH RLC CH of the second IAB node on the target path, to be specific, includes an identifier of a BH RLC CH on an egress link at the corresponding first IAB node when a BH RLC CH on an ingress link is the default BH RLC CH of the second IAB node on the target path. The identifier of the BH RLC CH on the egress link is determined by the identifier of the next-hop node of the first IAB node and a BH RLC CH ID between the first IAB node and the next-hop node.

Optionally, in this step, the configuration information obtained by the first IAB node may carry thirteenth indication information indicating that the first IAB node may send the first RRC message buffered by the first IAB node to the second IAB node.

Specifically, the first IAB node may obtain the configuration information in step 2 from the source IAB donor CU by using the RRC message or the F1AP message, or the first IAB node may obtain the configuration information in step 2 from the IAB donor CU to which the first IAB node is connected after TNL migration by using the F1AP message after performing TNL migration.

Specifically, after obtaining the configuration information in step 2, the first IAB node may determine that the condition 1 is effective, and the first IAB node may send the first RRC message to the second IAB node. In a possible example, the first IAB node may determine, based on the thirteenth indication information in the configuration information obtained in step 2, that the first IAB node can send the first RRC message buffered by the first IAB node to the second IAB node. In this case, the condition 1 is that the first IAB node receives the thirteenth indication information. In another possible example, as long as the configuration information obtained in step 2 includes the route and bearer mapping-related configurations of the first IAB node on the target path, in other words, it is considered that these route and bearer mapping-related configurations may be used to transmit the data packet related to the TNL migration of the second IAB node, the first IAB node further determines that the first IAB node may send the first RRC message buffered by the first IAB node to the second IAB node. In this case, the condition 1 is that the first IAB node receives the route and bearer mapping-related configurations on the target path of the first IAB node, or the first IAB node receives the route and bearer mapping-related configurations that may be used to transmit the data packet related to TNL migration of the second IAB node on the target path of the first IAB node.

Step 3: The first IAB node sends fifteenth indication information to the second IAB node, and the second IAB node determines, based on the fifteenth indication information, that the condition 2 is effective.

Specifically, after determining that the condition 1 is effective, the first IAB node sends the fifteenth indication information to the second IAB node. The fifteenth indication information may be carried in a BAP control PDU (BAP control PDU) and sent to the second IAB node, or may be carried in a MAC control element (MAC control element, MAC CE) and sent to the second IAB node, or is carried in downlink control information (Downlink Control Information, DCI) at a physical layer and sent to the second IAB node.

Step 4: The second IAB node performs the TNL migration process based on the first RRC message.

According to the two solutions of this embodiment, in a topology update process of the IAB node, the IAB node and the descendent nodes may execute TNL migration processes in a very compact manner, to avoid a case in which execution time of the entire topology update process is prolonged because the descendent node needs to try again after a migration failure generated when the descendent node makes an unnecessary TNL migration attempt in advance when the descendent node is unaware of a connection establishment status and a configuration obtaining status of an upstream node, and to avoid a case in which the execution time of the entire topology update process is prolonged because the descendent node performs TNL migration too late. In this way, impact of an IAB migration process on the service interruption duration of the UE can be effectively reduced.

Embodiment 4

In this embodiment of this application, an IAB node may further select a buffer status report (Buffer status report, BSR) format when a wireless backhaul link supports logical channel group (Logical channel group, LCG) extension.

The following describes terms mentioned below in detail.

LCG ID: An LCG ID is an identifier of a logical channel group, and has a length of 3 bits.

$LCG_i$: In a long BSR (Long BSR) format, if a value of the field is 1, it indicates that a BSR includes a buffer size field of a logical channel group i. If the value of the field is 0, it indicates that the BSR does not include the buffer size field of the logical channel group i. In a long truncated BSR (long truncated BSR) format, the field indicates whether a logical channel group i has to-be-sent data. Specifically, if a value of the field is 1, it indicates that the logical channel group i has the to-be-sent data. If the value is 0, it indicates that the logical channel group i does not have the to-be-sent data. i is an integer, and a value range is 0≤i≤7.

Buffer Size: A buffer size indicates a sum of to-be-sent data volumes corresponding to all logical channels in a logical channel group. A data volume of each logical channel group refers to a sum of to-be-transmitted data volumes corresponding to all logical channels in the logical channel group that are counted after a MAC PDU is assembled. A unit of the data volume is byte (byte). A length of a buffer size field corresponding to each LCG is 5 bits in a short BSR or short truncated BSR format, and a length of the buffer size field corresponding to each LCG is 8 bits in the long BSR or long truncated BSR format.

In an IAB network, in a possible implementation, there may be a plurality of IAB nodes within a range managed by an IAB donor, and each wireless backhaul node is capable of providing access and backhaul services for a plurality of different user equipments (UEs). Considering that UEs served by these IAB nodes may have a plurality of types of services, and QoS requirements of different types of services of these different UEs are also different, in a wireless backhaul link, different BH RLC CHs are used to provide different QoS guarantees for data or signaling on the wireless backhaul link. On a wireless backhaul link, a maximum of more than 60,000 BH RLC CHs can be configured. Each BH RLC CH corresponds to a logical channel. In uplink transmission, an MT part of the IAB node reports a BSR to a parent node, to notify the parent node of a data volume of a to-be-sent uplink data packet. The BSR may be considered as a manner in which a child node requests an uplink scheduling resource from a parent node, so that a DU part of the parent node allocates an uplink transmission resource to the child node. In the BSR reported by the IAB node to the parent node, the buffered data volume is reported by using an LCG as a granularity. The BSR may have a plurality of different formats. For example, refer to FIG. 10. A short BSR type or short truncated BSR type may include buffer status information of only one LCG. Refer to FIG. 11. A long BSR type or long truncated BSR type may include buffer status information of a maximum of eight LCGs. Each logical channel group generally includes logical channels with similar scheduling requirements. Specific logical channels in each logical channel group are determined by the parent node of the IAB node. After the parent node of the IAB node generates configuration information, the configuration information is sent to the IAB node by the IAB donor (when the IAB donor is in CU-DU separation, the IAB donor is specifically an IAB donor CU; or when the IAB donor CU is in CP-UP separation, the IAB donor may be specifically an IAB donor CU-CP) by using an RRC message.

In a current protocol specification, only eight logical channel groups are supported. This value is reasonable for an access link between UE and a base station because a quantity of logical channels between the UE and the base station does not generally exceed 32. However, when logical channels of the wireless backhaul link are expanded to support a maximum of more than 60,000 logical channels, each logical channel group may include thousands of logical channels, and scheduling requirements of the thousands of logical channels may vary greatly. Therefore, in this application, it is considered that a quantity of LCGs of the wireless backhaul link is extended, so that logical channels with greatly different scheduling requirements can be separately configured in different logical channel groups, thereby improving scheduling rationality and fairness. A maximum value of extended LCGs may be a value such as 16, 32, 64, or 256. A specific value is not limited in this embodiment of this application.

Figure 12:
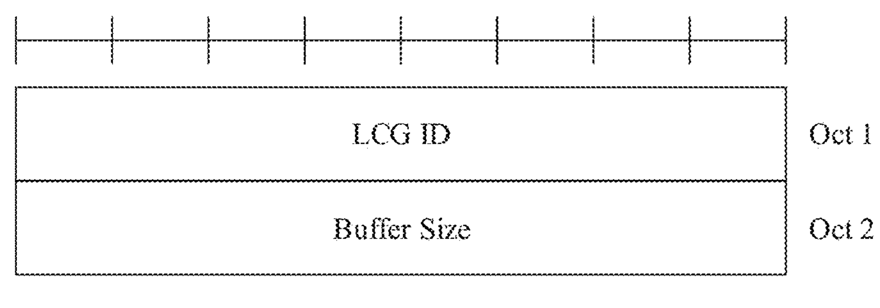
FIG. 12 is a schematic diagram of a new short BSR format or a new short truncated BSR format according to an embodiment of this application.
Figure 13:
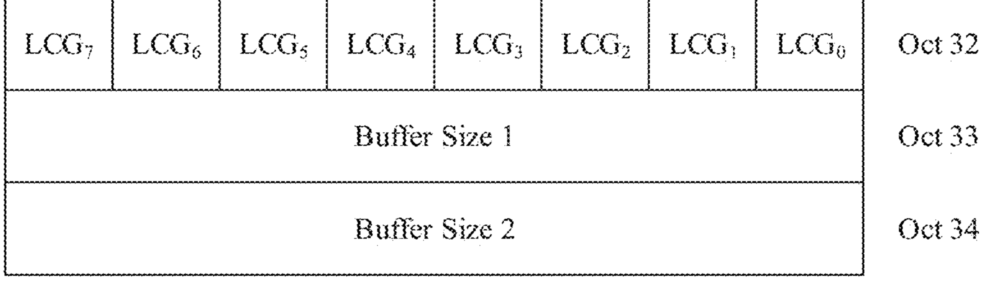
FIG. 13 is a schematic diagram of a new long BSR format or a new long truncated BSR format according to an embodiment of this application.
Figure 13:
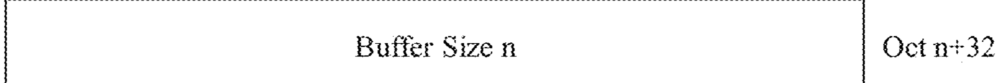

After the quantity of logical channel groups is extended, on one hand, logical channel group identifiers (Logical Channel Group IDs, LCG IDs) also need to be extended. For example, the LCG IDs may be extended to 4 bits if the maximum value of LCGs is extended to 16, or the LCG IDs need to be extended to 8 bits if the maximum value of the LCGs is 256. On the other hand, after the LCG IDs are extended, correspondingly, the BSR formats also need to be extended, and new BSR formats need to be introduced. For example, after the maximum value of LCGs is extended to 256, a new short BSR format that supports the extended LCGs, a new short truncated BSR format that supports the extended LCGs, a new long BSR format that supports the extended LCGs, and a new long truncated BSR format that supports the extended LCGs need to be introduced. In a possible example, it is assumed that the new short BSR format and the new short truncated BSR format are shown in FIG. 12. In another possible example, it is assumed that the new long BSR format is shown in FIG. 13. Specific designs of the new BSR formats (including, for example, the new short BSR format, the new short truncated BSR format, the new long BSR format, and the new long truncated BSR format) that need to be introduced after the LCGs are extended is not limited in this embodiment of this application.

After the maximum value of logical channel groups is extended, to enable the IAB node to select an appropriate BSR format to report the BSR, so as to minimize reporting signaling overheads, this application provides the following solution for selecting the BSR format for reporting buffered data volume information on the wireless backhaul link, and the solution is applicable to the IAB node (which may be specifically the MT part of the IAB node).

In a possible implementation, if the IAB node is configured with the extended LCG, when the IAB node needs to report the BSR, the IAB node uses the new BSR format that supports the extended LCG.

In another possible implementation, if the IAB node is configured with the extended LCGs, and the BSR needs to include buffer status information in at least one extended LCG, the new BSR format that supports the extended LCGs is used. Otherwise, an existing BSR format (namely, a short BSR/short truncated BSR/long BSR/long truncated BSR format specified in an existing protocol, or collectively referred to as a legacy BSR format) may be used. In an example, when the IAB node is configured with the extended LCGs, but all LCGs that need to report buffer statuses are legacy (legacy) LCGs, the existing BSR format is still used. In this manner, even if the LCGs are extended on the wireless backhaul link between the IAB node and the parent node, the IAB node may still report the buffered data volume information by using the existing BSR format in some cases, thereby reducing reporting overheads to some extent.

In still another possible implementation, the maximum value of LCGs supported by the protocol is extended to a value X (for example, X=16, 32, or 256), and a specific value of X is not limited. However, a quantity of LCGs and a length of an LCG ID on the wireless backhaul link between the IAB node and the parent node may still be configured. Based on the configured quantity of LCGs and/or the length of LCG ID, the IAB node may determine the new BSR format that supports the extended LCGs. That the IAB node obtains configuration information of the quantity of LCGs and/or the length of the LCG ID on the wireless backhaul link between the IAB node and the parent node may be specifically: After the parent node of the IAB node determines the configuration information, the IAB donor configures the configuration information for the IAB node; or after determining the configuration information, the IAB donor directly configures the configuration information for the IAB node; or after determining the configuration information, the IAB donor first configures the configuration information for the parent node of the IAB node, and then the parent node of the IAB node configures the configuration information for the IAB node. In an example of this implementation, X=256, but a maximum quantity of LCGs between the IAB node and the parent node is configured as 16, and the length of the LCG ID is 4 bits. In this case, when the IAB node needs to use a BSR format that supports the extended LCGs, a new BSR format that supports the extended LCGs corresponding to the maximum quantity of supported LCGs of 16 may be selected. For example, a short BSR format that supports LCG extension and in which a maximum quantity of extended LCGs is 16 may be the format shown in FIG. 12. Four least significant bits corresponding to a first byte (Oct 1) are set as reserved (Reserved) bits. Alternatively, four least significant bits corresponding to a first byte (Oct 1) and four (or two) highest significant bits in a second byte are set as a buffer size field together, and four (or six) least significant bits in the second byte are set as reserved bits. For example, a long BSR format that supports LCG extension and in which a maximum quantity of extended LCGs is 16 may be the format shown in FIG. 13. A first byte (Oct 1) and a second byte (Oct 2) are separately set to a bitmap corresponding to an LCG ID from a maximum value (LCG 15) to a minimum value (LCG 0). A part after a third byte is set to a buffer size field corresponding to an LCG whose value is 1 in the bitmap. A specific setting in which the wireless backhaul link supports different LCG ID lengths, or a specific setting of anew BSR format that supports different quantities of extended LCGs is not limited in this embodiment of this application.

It should be noted that, for ease of understanding, in this application, a logical channel group whose LCG ID is greater than 7 may be considered as an extended LCG, and a logical channel group whose LCG ID is a value of {0, 1, 2, 3, 4, 5, 6, 7} is considered as a legacy (legacy) LCG.

A specific BSR format (the new short BSR format, the new short truncated BSR format, the new long BSR format, or the new long truncated BSR format) that is used by the IAB node and that supports extended LCGs is determined still based on a specific reporting requirement. This is similar to a manner in which the IAB node or UE currently selects a format from {short BSR, short truncated BSR, long BSR, long truncated BSR}. For example, if the IAB node needs to report only buffer status information in one extended LCG on the wireless backhaul link to the parent node, the new short BSR format is used.

Based on the solution in this embodiment of this application, after the logical channel groups on the wireless backhaul link are extended, the IAB node may select the appropriate BSR format based on an actual situation of a link between the IAB node and the parent node to report the BSR, thereby reducing the signaling overheads.

Figure 14:
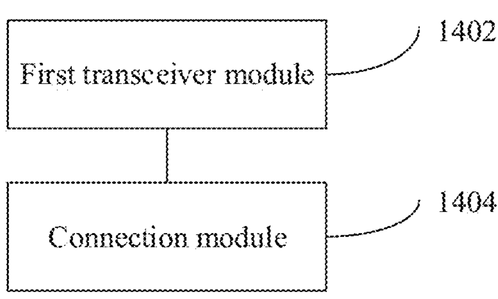
FIG. 14 is a schematic diagram of a structure of an IAB node connection update apparatus according to an embodiment of this application.

Based on a same concept as the foregoing method embodiments, embodiments of this application further provide IAB node connection update apparatuses. FIG. 14 is a schematic diagram of a structure of an IAB node connection update apparatus according to an embodiment of this application. The apparatus is configured to implement the method described in the foregoing method embodiment. In a possible implementation, the apparatus includes a first transceiver module 1402 and a connection module 1404.

The first transceiver module 1402 is configured to receive first indication information; and

- the connection module 1404 is configured to establish, based on the first indication information, an F1 connection between a DU part of a first IAB node and a target IAB donor.

In a possible implementation, the apparatus further includes:

- a change module, configured to change a cell served by the DU part of the first IAB node from a cell managed by a source IAB donor to a cell managed by the target IAB donor.

In a possible implementation, the first transceiver module 1402 includes:

- a first transceiver submodule, configured to receive the first indication information from the source IAB donor; or
- a second transceiver submodule, configured to receive the first indication information from an operations, administration, and maintenance OAM.

In a possible implementation, the first indication information is an IP address of the target IAB donor; or

- the first indication information includes an IP address of the target IAB donor, and explicit indication information indicating the DU part of the first IAB node to initiate establishment of the F1 connection to the target IAB donor.

In a possible implementation, the second transceiver submodule is specifically configured to:

- determine an identifier of a target cell, where the target cell is a cell accessed by the first IAB node after a connection update;
- send the identifier of the target cell to the operations, administration, and maintenance OAM, so that the operations, administration, and maintenance OAM determines the target IAB donor based on the identifier of the target cell; and
- receive the first indication information from the operations, administration, and maintenance OAM.

In a possible implementation, the first transceiver submodule is specifically configured to:

- send a measurement report to the source IAB donor, where the first indication information is determined by the source IAB donor based on the measurement report; and
- receive the first indication information from the source IAB donor.

In a possible implementation, the first transceiver submodule is specifically configured to:

- execute, by an MT part of the first IAB node, a radio resource control RRC re-establishment process after a radio link failure occurs, to connect to the target IAB donor after accessing a target cell, where the first indication information is determined by the source IAB donor based on a request message used to request context of the first IAB node, and the request message used to request the context of the first IAB node is sent by the target IAB donor to the source IAB donor; and
- receive the first indication information from the source IAB donor.

In a possible implementation, the change module includes:

- a third transceiver submodule, configured to receive second indication information; and a change submodule, configured to change, based on the second indication information, the cell served by the DU part of the first IAB node from the cell managed by the source IAB donor to the cell managed by the target IAB donor; or a first determining module, configured to determine that the descendent UE of the first IAB node and/or the descendent IAB node of the first IAB node receive/receives configuration information; and a change submodule, configured to change the cell served by the DU part of the first IAB node from the cell managed by the source IAB donor to the cell managed by the target IAB donor, where the configuration information is RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor; or a third transceiver submodule, configured to receive second indication information, and determine that the descendent UE of the first IAB node and/or the descendent IAB node of the first IAB node receive/receives configuration information; and a change submodule, configured to change the cell served by the DU part of the first IAB node from the cell managed by the source IAB donor to the cell managed by the target IAB donor, where the configuration information is RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor.

In a possible implementation, the third transceiver submodule is specifically configured to:

if the MT part of the first IAB node is still connected to the source IAB donor, receive the second indication information carried in a radio resource control RRC message from the source IAB donor, where the second indication information indicates that the cell served by the DU part of the first IAB node may be changed to the cell managed by the target IAB donor; or receive the second indication information carried in an F1 application protocol FLAP message from the source IAB donor, where the second indication information indicates that the cell served by the DU part of the first IAB node may be changed to the cell managed by the target IAB donor.

In a possible implementation, the third transceiver submodule is specifically configured to:

if the MT part of the first IAB node has been connected to the target IAB donor, receive the second indication information carried in a radio resource control RRC message from the target IAB donor, where the second indication information indicates that the cell served by the DU part of the first IAB node may be changed to the cell managed by the target IAB donor; or receive the second indication information carried in an F1 application protocol FLAP message from the target IAB donor, where the second indication information indicates that the cell served by the DU part of the first IAB node may be changed to the cell managed by the target IAB donor.

In a possible implementation, the first determining module is specifically configured to:

receive an F1 application protocol F1AP message from the source IAB donor, where the F1 application protocol F1AP message carries an RRC message container, and an RRC message of the descendent UE of the first IAB node and/or an RRC message of the descendent IAB node of the first IAB node are/is encapsulated in the RRC message container; and if the F1 application protocol F1AP message carries third indication information, after the RRC messages/the RRC message are/is successfully sent to the descendent UE of the first IAB node and/or the descendent IAB node of the first IAB node, determine that the descendent UE of the first IAB node and/or the descendent IAB node of the first IAB node receive/receives the configuration information; or if the F1 application protocol F1AP message is carried in a data packet with a first sequence number, after the RRC messages/the RRC message are/is successfully sent to the descendent UE of the first IAB node and/or the descendent IAB node of the first IAB node, determine that the descendent UE of the first IAB node and/or the descendent IAB node of the first IAB node receive/receives the configuration information, where the first sequence number is a data packet sequence number at a stream control transmission protocol SCTP layer, and is configured by the source IAB donor for the first IAB node.

In a possible implementation, the third indication information is indication information indicating the first IAB node to stop data transmission scheduling on the descendent UE of the first IAB node and/or the descendent IAB node of the first IAB node; or the third indication information indicates that the RRC message carried in the RRC message container includes the RRC configuration information for accessing the cell managed by the target IAB donor by the descendent UE of the first IAB node and/or the descendent IAB node of the first IAB node, where the cell managed by the target IAB donor is a cell served by the DU part of the first IAB node after the cell served by the DU part of the first IAB node is changed to the cell managed by the target IAB donor.

In a possible implementation, the apparatus further includes:

a second determining module, configured to determine, based on the third indication information carried in the F1 application protocol F1AP message or the F1 application protocol F1AP message carried in the data packet with the first sequence number, that the RRC message of the descendent UE of the first IAB node and/or the RRC message of the descendent IAB node of the first IAB node carried in the F1 application protocol F1AP message include/includes the RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor; and buffer the RRC message of the descendent UE of the first IAB node and/or the RRC message of the descendent IAB node of the first IAB node, and after the second indication information is received, send the RRC message of the descendent UE of the first IAB node and/or the RRC message of the descendent IAB node of the first IAB node to the descendent UE of the first IAB node and/or the descendent IAB node of the first IAB node.

In a possible implementation, the apparatus further includes:

a broadcasting module, configured to broadcast fourth indication information, where the fourth indication information indicates that the descendent UE of the first IAB node and/or the descendent IAB node of the first IAB node make/makes the configuration information effective; or a second transceiver module, configured to indicate duration information to the descendent UE of the first IAB node and/or the descendent IAB node of the first IAB node, where the duration information indicates a moment at which the descendent UE of the first IAB node and/or the descendent IAB node of the first IAB node make/makes the configuration information effective.

Figures 15, 16, 17:
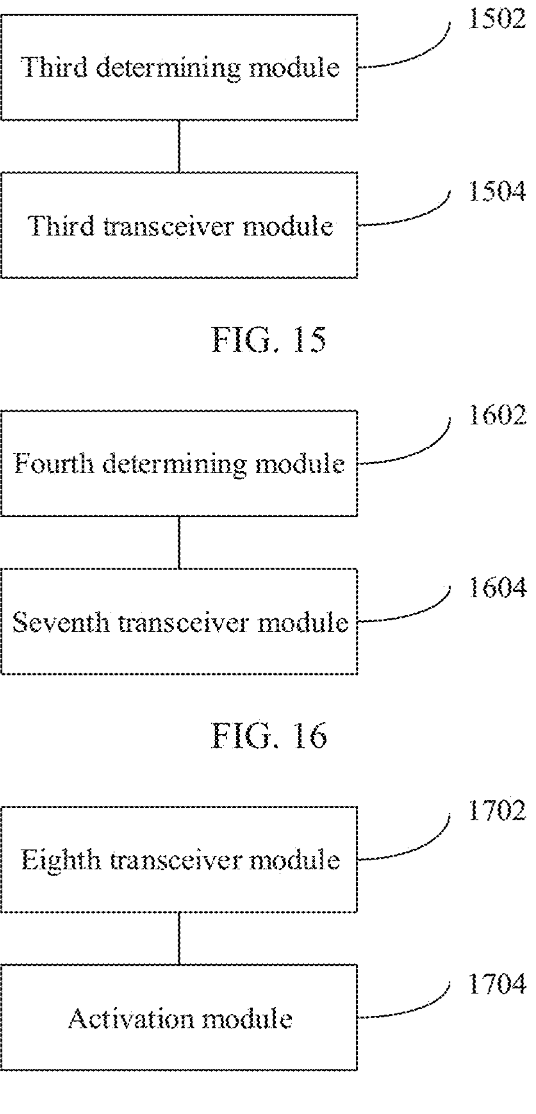
FIG. 15 is another schematic diagram of a structure of an IAB node connection update apparatus according to an embodiment of this application.
FIG. 16 is another schematic diagram of a structure of an IAB node connection update apparatus according to an embodiment of this application.
FIG. 17 is another schematic diagram of a structure of an IAB node connection update apparatus according to an embodiment of this application.

Based on a same concept as the foregoing method embodiment, an embodiment of this application further provides an IAB node connection update apparatus. FIG. 15 is a schematic diagram of a structure of an IAB node connection update apparatus according to an embodiment of this application. The apparatus is configured to implement the method described in the foregoing method embodiment. In a possible implementation, the apparatus includes a third determining module 1502 and a third transceiver module 1504.

The third determining module 1502 is configured to determine that a DU part of a first IAB node needs to perform a connection update to establish an F1 connection to a target IAB donor; and the third transceiver module 1504 is configured to send first indication information to the first IAB node, where the first indication information indicates the DU part of the first IAB node to establish the F1 connection to the target IAB donor.

In a possible implementation, the apparatus further includes:

a fourth transceiver module, configured to send second indication information to the first IAB node, where the second indication information indicates that a cell served by the DU part of the first IAB node is to be changed from a cell managed by a source IAB donor to a cell managed by the target IAB donor.

In a possible implementation, the apparatus further includes:

a fifth transceiver module, configured to send a first request message to the target IAB donor, where the first request message is used to request an IP address of the target IAB donor, where the fifth transceiver module is further configured to receive a first response message from the target IAB donor, where the first response message includes the IP address of the target IAB donor, and the first indication information is the IP address of the target IAB donor; or the first indication information includes the IP address of the target IAB donor, and explicit indication information indicating the DU part of the first IAB node to initiate establishment of the F1 connection to the target IAB donor.

In a possible implementation, the sending first indication information to the first IAB node includes:

receiving a measurement report from the first IAB node; and determining, by the source IAB donor, the first indication information based on the measurement report; and sending the first indication information to the first IAB node.

In a possible implementation, the sending first indication information to the first IAB node includes:

when an MT part of the first IAB node performs a radio resource control RRC re-establishment process after a radio link failure occurs, to connect to the target IAB donor after accessing a target cell, receiving, from the target IAB donor, a request message used to request context of the first IAB node, and determining the first indication information based on the request message used to request the context of the first IAB node, where the target cell is a cell accessed by the first IAB node after the connection update; and sending the first indication information to the first IAB node.

In a possible implementation, the fourth transceiver module is specifically configured to:

if the MT part of the first IAB node is still connected to the source IAB donor, send the second indication information carried in a radio resource control RRC message to the MT part of the first IAB node, where the second indication information indicates that the cell served by the DU part of the first IAB node may be changed to the cell managed by the target IAB donor; or send the second indication information carried in an F1 application protocol F1AP message to the DU part of the first IAB node, where the second indication information indicates that the cell served by the DU part of the first IAB node may be changed to the cell managed by the target IAB donor.

In a possible implementation, the apparatus further includes:

a sixth transceiver module, configured to send the F1 application protocol F1AP message to the DU part of the first IAB node, where the F1 application protocol F1AP message carries an RRC message container and third indication information; an RRC message of descendent UE of the first IAB node and/or an RRC message of a descendent IAB node of the first IAB node are/is encapsulated in the RRC message container, so that after successfully sending the RRC messages/the RRC message to the descendent UE of the first IAB node and/or the descendent IAB node of the first IAB node, the first IAB node determines that the descendent UE of the first IAB node and/or the descendent IAB node of the first IAB node receive/receives configuration information, where the configuration information is RRC configuration information for accessing the cell managed by the target IAB donor by the descendent UE of the first IAB node and/or the descendent IAB node of the first IAB node after the cell served by the DU part of the first IAB node is changed to the cell managed by the target IAB donor.

In a possible implementation, the third indication information is indication information indicating the first IAB node to stop data transmission scheduling on the descendent UE of the first IAB node and/or the descendent IAB node of the first IAB node; or the third indication information indicates that the RRC message carried in the RRC message container includes the RRC configuration information for accessing the cell managed by the target IAB donor by the descendent UE of the first IAB node and/or the descendent IAB node of the first IAB node, where the cell managed by the target IAB donor is a cell served by the DU part of the first IAB node after the cell served by the DU part of the first IAB node is changed to the cell managed by the target IAB donor.

Based on a same concept as the foregoing method embodiment, an embodiment of this application further provides an IAB node connection update apparatus. FIG. 16 is a schematic diagram of a structure of an IAB node connection update apparatus according to an embodiment of this application. The apparatus is configured to implement the method described in the foregoing method embodiment. In a possible implementation, the apparatus includes a fourth determining module 1602 and a seventh transceiver module 1604.

The fourth determining module 1602 is configured to determine that a DU part of a first IAB node needs to establish an F1 connection to a target IAB donor; and the third transceiver module 1604 is configured to send first indication information to the first IAB node, where the first indication information indicates the first IAB node to establish the F1 connection to the target IAB donor.

In a possible implementation, the first indication information is an IP address of the target IAB donor; or the first indication information includes an IP address of the target IAB donor, and explicit indication information indicating the DU part of the first IAB node to initiate establishment of the F1 connection to the target IAB donor.

Based on a same concept as the foregoing method embodiment, an embodiment of this application further provides an IAB node connection update apparatus. FIG. 17 is a schematic diagram of a structure of an IAB node connection update apparatus according to an embodiment of this application. The apparatus is configured to implement the method described in the foregoing method embodiment. In a possible implementation, the apparatus includes an eighth transceiver module 1702 and an activation module 1704.

The eighth transceiver module 1702 is configured to receive configuration information from a DU part of a first IAB node, where the configuration information is RRC configuration information for accessing a cell managed by a target IAB donor by descendent UE of the first IAB node and/or a descendent IAB node of the first IAB node after a cell served by the DU part of the first IAB node is changed to the cell managed by the target IAB donor; and the activation module 1704 is configured to make the configuration information effective.

In a possible implementation, the configuration information includes fifth indication information, and the fifth indication information indicates to delay to make the configuration information effective; and the activation module 1704 is specifically configured to:

receive fourth indication information from the DU part of the first IAB node; and make the configuration information effective based on the fourth indication information.

In a possible implementation, the apparatus further includes:

a ninth transceiver module, configured to receive duration information from the first IAB node, where the duration information indicates a moment at which the descendent UE of the first IAB node and/or the descendent IAB node of the first IAB node make/makes the configuration information effective; and the activation module 1704 is specifically configured to:

make the configuration information effective based on the moment at which the configuration information is effective.

In a possible implementation, the activation module 1704 is specifically configured to:

when a descendent node finds a target cell, make the configuration information effective, where the target cell is a cell served by the DU part of the first IAB node after the cell served by the DU part of the first IAB node is changed to the cell managed by the target IAB donor, and is identified by a target cell identifier in the configuration information.

In a possible implementation, the activation module 1704 is specifically configured to:

access the target cell based on the configuration information, to establish a connection to the target IAB donor.

In the schematic diagram of the structure of the IAB node connection update apparatus shown in FIG. 14, 15, 16, or 17 provided in embodiments of this application, steps in Embodiment 2, Embodiment 3, or Embodiment 4 may be further performed.

An embodiment of this application further provides an IAB node connection update apparatus, including at least one processor. The processor is configured to execute a program stored in a memory. When the program is executed, the apparatus performs the steps of the IAB node connection update methods/IAB node connection update method shown in FIG. 8(*a*), FIG. 8(*b*), and/or FIG. 8(*c*).

An embodiment of this application provides a computer-readable storage medium. The computer-readable storage medium stores a computer program. When the computer program is executed by a processor, the steps of the IAB node connection update methods/IAB node connection update method shown in FIG. 8(*a*), FIG. 8(*b*), and/or FIG. 8(*c*) are performed.

Based on a same concept as the foregoing method embodiment, an embodiment of this application further provides a computer program product including instructions. When the computer program product runs on a computer, the computer is enabled to perform the steps of the IAB node connection update methods/IAB node connection update method shown in FIG. 8(*a*), FIG. 8(*b*), and/or FIG. 8(*c*).

It should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A communication method, applied to an integrated access and backhaul (IAB) node and comprising:

receiving configuration information for setup of a distributed unit (DU) part of the IAB node; and determining, based on a manner of receiving the configuration information, that a master node of the IAB node or a secondary node of the IAB node is a donor node of the IAB node, comprising:

in response to the configuration information is second configuration information generated by the master node of the IAB node, determining that the master node of the IAB node is the donor node of the IAB node; or in response to the configuration information is third configuration information generated by the secondary node of the IAB node, determining that the secondary node of the IAB node is the donor node of the IAB node.

2. The method according to claim 1, wherein the method further comprises:

in response to the configuration information is the second configuration information generated by the master node of the IAB node, determining that a link, corresponding to a master cell group (MCG), between the IAB node and a parent node of the IAB node is a default backhaul link (default BH link); or in response to the configuration information is the third configuration information generated by the secondary node of the IAB node, determining that a link, corresponding to a secondary cell group (SCG), between the IAB node and a parent node of the IAB node is a default backhaul link (default BH link).

3. The method according to claim 2, wherein the determining, based on a manner of receiving the configuration information, that a master node of the IAB node or a secondary node of the IAB node is a donor node of the IAB node comprises:

in response to the configuration information is comprised in a radio resource control (RRC) message over the signaling radio bearer (SRB3), determining that the link, corresponding to the secondary cell group (SCG), between the IAB node and the parent node of the IAB node is the default backhaul (default BH) link of the IAB node;

in response to the configuration information is encapsulated in the RRC message container comprised in the RRC message over the signaling radio bearer (SRB1) or the signaling radio bearer (SRB2), determining that the link, corresponding to the secondary cell group (SCG), between the IAB node and the parent node of the IAB node is the default backhaul (default BH) link of the IAB node; or in response to the configuration information is comprised in the RRC message over the signaling radio bearer (SRB1) or the signaling radio bearer (SRB2), and is not encapsulated in the RRC message container comprised in the RRC message over the SRB1 or the SRB2, determining that the link, corresponding to the master cell group (MCG), between the IAB node and the parent node of the IAB node is the default backhaul (default BH) link of the IAB node.

4. The method according to claim 1, wherein the configuration information for setup of the DU part of the IAB node comprises: a default BH RLC CH identifier (default BH RLC CH ID), and a default BAP routing identifier (default BAP routing ID).

5. The method according to claim 1, wherein the determining, based on a manner of receiving the configuration information, that a master node of the IAB node or a secondary node of the IAB node is a donor node of the IAB node comprises:

in response to the configuration information is comprised in a radio resource control (RRC) message over a signaling radio bearer (SRB3), determining that the secondary node of the IAB node is the donor node of the IAB node;

in response to the configuration information is encapsulated in an RRC message container comprised in a radio resource control (RRC) message over a signaling radio bearer (SRB1) or a signaling radio bearer (SRB2), determining that the secondary node of the IAB node is the donor node of the IAB node; or in response to the configuration information is comprised in a radio resource control (RRC) message over a signaling radio bearer (SRB1) or a signaling radio bearer (SRB2), and is not encapsulated in an RRC message container comprised in the RRC message over the SRB1 or the SRB2, determining that the master node of the IAB node is the donor node of the IAB node.

6. A data transmission apparatus, wherein the apparatus comprises one or more processors to run instructions, enabling the apparatus to:

receive configuration information for setup of a distributed unit (DU) part of the IAB node; and determine, based on a manner of receiving the configuration information, that a master node of the IAB node or a secondary node of the IAB node is a donor node of the IAB node, comprising:

in response to the configuration information is second configuration information generated by the master node of the IAB node, determine that the master node of the IAB node is the donor node of the IAB node; or in response to the configuration information is third configuration information generated by the secondary node of the IAB node, determine that the secondary node of the IAB node is the donor node of the IAB node.

7. The apparatus according to claim 6, wherein the apparatus is further caused to:

in response to the configuration information is the second configuration information generated by the master node of the IAB node, determine that a link, corresponding to a master cell group (MCG), between the IAB node and a parent node of the IAB node is a default backhaul link (default BH link); or in response to the configuration information is the third configuration information generated by the secondary node of the IAB node, determine that a link, corresponding to a secondary cell group (SCG), between the IAB node and a parent node of the IAB node is a default backhaul link (default BH link).

8. The apparatus according to claim 7, wherein the apparatus is further caused to:

in response to the configuration information is comprised in radio resource control (RRC) message over the signaling radio bearer (SRB3), determine that the link, corresponding to the secondary cell group (SCG), between the IAB node and the parent node of the IAB node is the default backhaul (default BH) link of the IAB node;

in response to the configuration information is encapsulated in the RRC message container comprised in the radio resource control (RRC) message over the signaling radio bearer (SRB1) or the signaling radio bearer (SRB2), determine that the link, corresponding to the secondary cell group (SCG), between the IAB node and the parent node of the IAB node is the default backhaul (default BH) link of the IAB node; or in response to the configuration information is comprised in the radio resource control (RRC) message over the signaling radio bearer (SRB1) or the signaling radio bearer (SRB2), and is not encapsulated in the RRC message container comprised in the RRC message over the SRB1 or the SRB2, determine that the link, corresponding to the master cell group (MCG), between the IAB node and the parent node of the IAB node is the default backhaul (default BH) link of the IAB node.

9. The apparatus according to claim 6, wherein the configuration information for setup of the DU part of the IAB node comprises: a default BH RLC CH identifier (default BH RLC CH ID), and a default BAP routing identifier (default BAP routing ID).

10. The apparatus according to claim 6, wherein the apparatus is further caused to:

in response to the configuration information is comprised in a radio resource control (RRC) message over a signaling radio bearer (SRB3), determine that the secondary node of the IAB node is the donor node of the IAB node;

in response to the configuration information is encapsulated in an RRC message container comprised in a radio resource control (RRC) message over a signaling radio bearer (SRB1) or a signaling radio bearer (SRB2), determine that the secondary node of the IAB node is the donor node of the IAB node; or in response to the configuration information is comprised in a radio resource control (RRC) message over a signaling radio bearer (SRB1) or a signaling radio bearer (SRB2), and is not encapsulated in an RRC message container comprised in the radio resource control (RRC) message over the SRB1 or the SRB2, determine that the master node of the IAB node is the donor node of the IAB node.

11. A non-transitory computer readable medium storing instructions that are executable by a computer, the non-transitory computer readable medium is applied to a first communication apparatus, and the instructions comprise instructions for:

receiving configuration information for setup of a distributed unit (DU) part of the IAB node; and determining, based on a manner of receiving the configuration information, that a master node of the IAB node or a secondary node of the IAB node is a donor node of the IAB node, comprising:

in response to the configuration information is second configuration information generated by the master node of the IAB node, determining that the master node of the IAB node is the donor node of the IAB node; or in response to the configuration information is third configuration information generated by the secondary node of the IAB node, determining that the secondary node of the IAB node is the donor node of the IAB node.

12. The non-transitory computer readable medium according to claim 11, wherein the configuration information for setup of the DU part of the IAB node comprises: a default BH RLC CH identifier (default BH RLC CH ID), and a default BAP routing identifier (default BAP routing ID).

13. The non-transitory computer readable medium according to claim 11, wherein the determining, based on a manner of receiving the configuration information, that a master node of the IAB node or a secondary node of the IAB node is a donor node of the IAB node comprises:

in response to the configuration information is comprised in a radio resource control (RRC) message over a signaling radio bearer (SRB3), determining that the secondary node of the IAB node is the donor node of the IAB node;

in response to the configuration information is encapsulated in an RRC message container comprised in a radio resource control (RRC) message over a signaling radio bearer (SRB1) or a signaling radio bearer (SRB2), determining that the secondary node of the IAB node is the donor node of the IAB node; or in response to the configuration information is comprised in a radio resource control (RRC) message over a signaling radio bearer (SRB1) or a signaling radio bearer (SRB2), and is not encapsulated in an RRC message container comprised in the radio resource control (RRC) message over the SRB1 or the SRB2, determining that the master node of the IAB node is the donor node of the IAB node.

14. The non-transitory computer readable medium according to claim 11, wherein the instructions further comprise instructions for:

in response to the configuration information is the second configuration information generated by the master node of the IAB node, determining that a link, corresponding to a master cell group (MCG), between the IAB node and a parent node of the IAB node is a default backhaul link (default BH link); or in response to the configuration information is the third configuration information generated by the secondary node of the IAB node, determining that a link, corresponding to a secondary cell group (SCG), between the IAB node and a parent node of the IAB node is a default backhaul link (default BH link).

15. The non-transitory computer readable medium according to claim 14, wherein the determining, based on a manner of receiving the configuration information, that a master node of the IAB node or a secondary node of the IAB node is a donor node of the IAB node comprises:

in response to the configuration information is comprised in a radio resource control (RRC) message over the signaling radio bearer (SRB3), determining that the link, corresponding to the secondary cell group (SCG), between the IAB node and the parent node of the IAB node is the default backhaul (default BH) link of the IAB node;

in response to the configuration information is encapsulated in the RRC message container comprised in the radio resource control (RRC) message over the signaling radio bearer (SRB1) or the signaling radio bearer (SRB2), determining that the link, corresponding to the secondary cell group (SCG), between the IAB node and the parent node of the IAB node is the default backhaul (default BH) link of the IAB node; or in response to the configuration information is comprised in the radio resource control (RRC) message over the signaling radio bearer (SRB1) or the signaling radio bearer (SRB2), and is not encapsulated in the RRC message container comprised in the RRC message over the SRB1 or the SRB2, determining that the link, corresponding to the master cell group (MCG), between the IAB node and the parent node of the IAB node is the default backhaul (default BH) link of the IAB node.

* * * * *